(12) United States Patent
Reimer

(10) Patent No.: US 11,616,763 B2
(45) Date of Patent: *Mar. 28, 2023

(54) SECURE ANONYMOUS COMMUNICATIONS METHODS AND APPARATUS

(71) Applicant: Charter Communications Operating, LLC, St. Louis, MO (US)

(72) Inventor: Mark Reimer, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 276 days.

This patent is subject to a terminal disclaimer.

(21) Appl. No.: 16/840,442

(22) Filed: Apr. 5, 2020

(65) Prior Publication Data

US 2020/0236087 A1   Jul. 23, 2020

Related U.S. Application Data

(63) Continuation of application No. 15/799,747, filed on Oct. 31, 2017, now Pat. No. 10,652,215.

(51) Int. Cl.
| | |
|---|---|
| *H04L 9/40* | (2022.01) |
| *G06F 21/62* | (2013.01) |
| *H04L 45/64* | (2022.01) |
| *G06F 9/455* | (2018.01) |
| *H04L 41/00* | (2022.01) |
| *H04L 67/56* | (2022.01) |

(52) U.S. Cl.
CPC ...... *H04L 63/0407* (2013.01); *G06F 9/45558* (2013.01); *G06F 21/6254* (2013.01); *H04L 41/00* (2013.01); *H04L 45/64* (2013.01); *H04L 63/0421* (2013.01); *H04L 63/20* (2013.01); *G06F 2009/45587* (2013.01); *G06F 2009/45595* (2013.01); *H04L 67/56* (2022.05)

(58) Field of Classification Search
CPC ..... H04L 63/0407; H04L 41/00; H04L 45/64; H04L 63/9421; H04L 67/56; G06F 9/45558; G06F 21/6254; G06F 2009/45587; G06F 2009/45595

See application file for complete search history.

(56) References Cited

U.S. PATENT DOCUMENTS

| | | | | |
|---|---|---|---|---|
| 8,014,757 | B1* | 9/2011 | Lim ........................ | H04L 51/58 455/445 |
| 2004/0215562 | A1* | 10/2004 | Lapstun ................ | G06Q 40/00 705/40 |
| 2015/0082050 | A1* | 3/2015 | Roullier .............. | G06F 21/6254 713/189 |
| 2017/0092076 | A1* | 3/2017 | Anderson ........... | G07F 17/3288 |
| 2019/0057208 | A1* | 2/2019 | Cannariato ........... | H04L 63/102 |

* cited by examiner

*Primary Examiner* — Duc C Ho

(74) *Attorney, Agent, or Firm* — Straub & Straub; Michael P. Straub; Stephen T. Straub

(57) ABSTRACT

Methods and apparatus for supporting secure anonymous communications are described. A first communications device, e.g., a virtual desktop device, in a communications network, e.g., a private ISP network, serves on behalf of a first user device as an endpoint for a communications session with a second device. The first communications device includes a fabricated set of device attribute information which is different from an actual set of device attribute information corresponding to the first user device. The communications network includes a set of onion routers and onion routing is used within the network.

20 Claims, 18 Drawing Sheets

| FIGURE 2A |
| FIGURE 2B |
| FIGURE 2C |
| FIGURE 2D |
| FIGURE 2E |

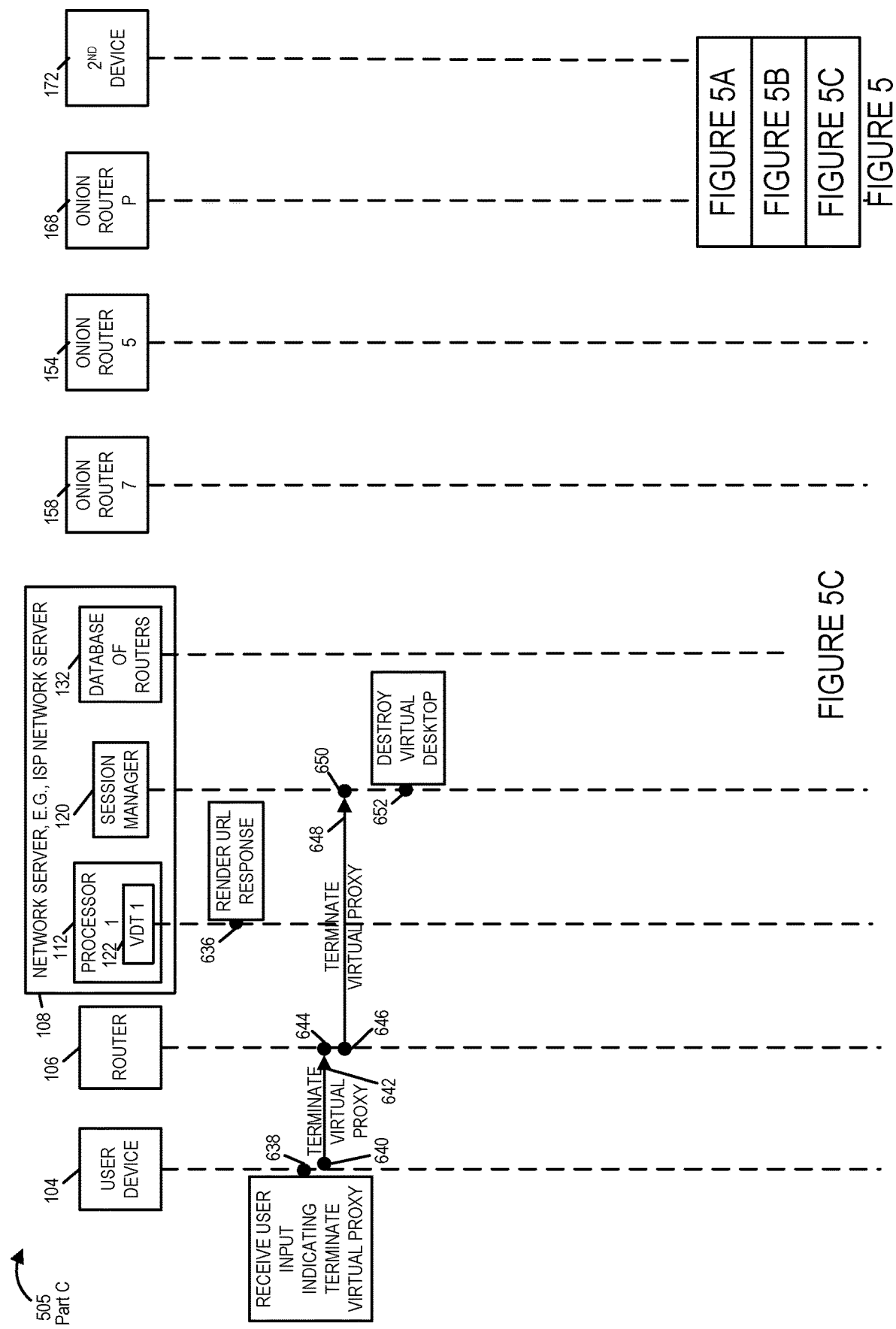

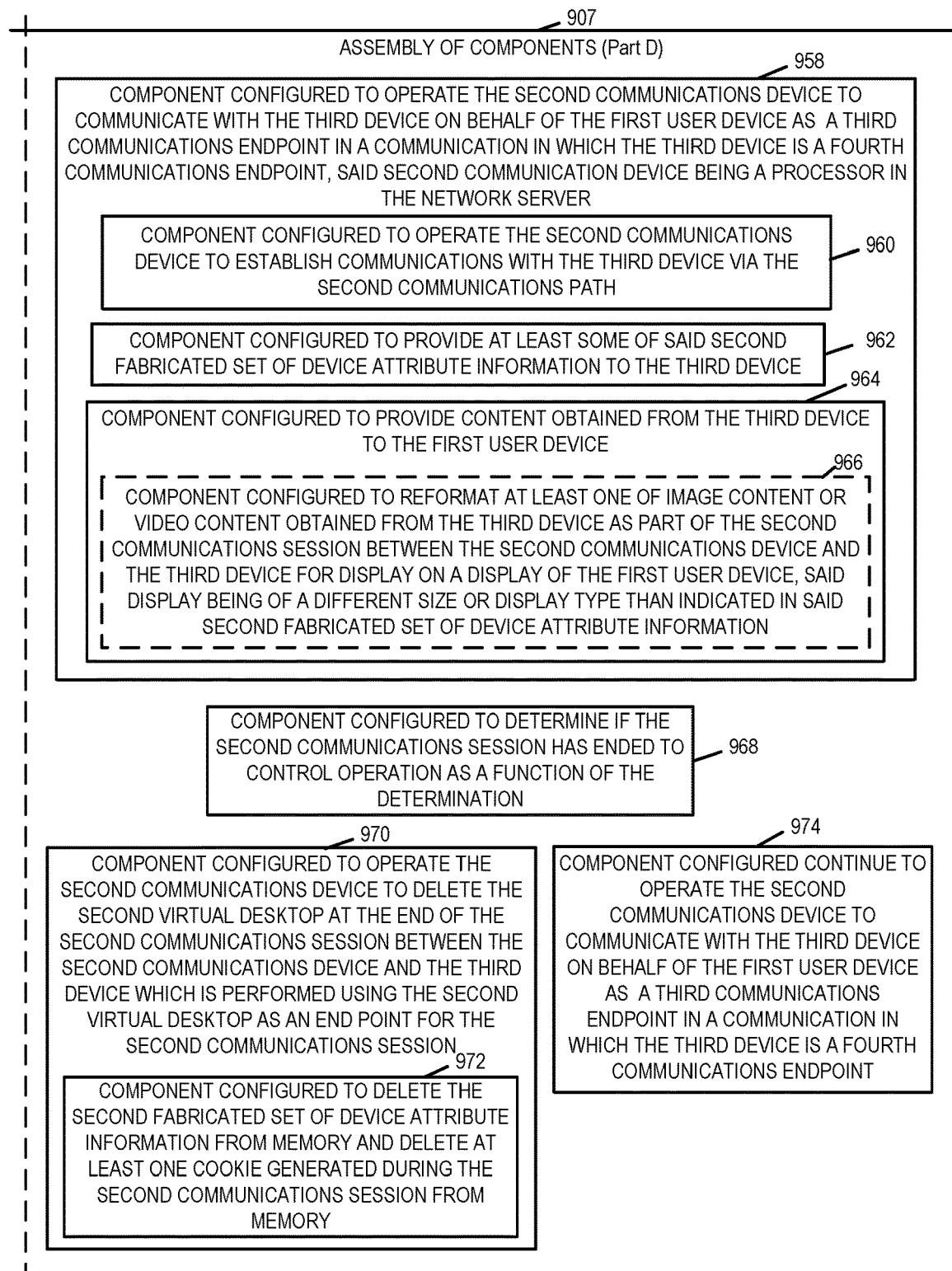

SECURE ANONYMOUS COMMUNICATIONS METHODS AND APPARATUS

RELATED APPLICATIONS

The present application is a continuation of U.S. patent application Ser. No. 15/799,747 filed on Oct. 31, 2017, which published on May 2, 2019 as US patent Publication No. 2019/0132292 A1, and which issued as U.S. Pat. No. 10,652,215 on May 12, 2020 and which is hereby expressly incorporated by reference in its entirety.

FIELD

The present application relates to communications systems and, more particularly, to methods and apparatus relating to secure anonymous communications.

BACKGROUND

Today it is very difficult to browse the Internet or communicate anonymously online. It requires specialized hardware and software, dedicated computers, and specialized technical knowledge to achieve anonymity online, and is very difficult to remain anonymous for any extended period of time. Companies spend enormous amounts of money to be able to identify you, e.g., identify your demographics, household information, income, and preferences, and track your online activity and spending habits. The information they compile about you is carefully maintained and curated. Approaches to identifying and tracking online behavior are becoming increasingly robust. In addition to the benign surveillance consumers agree to in the terms of use, there are numerous people and organizations that track our online activity for illegal uses such as identity theft, fraud, or revenge.

To combat online surveillance, Tor software is often used to conceal the sender and recipient by bouncing communications around a distributed network of relays, making it difficult to intercept online communications and identity the source. However, Tor has numerous limitations and drawbacks including one or more of the following:
  i) It is difficult for the layman to set up and configure;
  ii) It is ineffective against malware on the source computer;
  iii) It is becoming increasingly easy to identify the sender of a communication by controlling the exit node or controlling one or more tor routers;
  iv) DDoS attacks can be used to give up the source of online communications;
  v) The Tor network is based on volunteers and the health and maintenance of the network can not be guaranteed; and
  vi) There are fewer than 7,000 tor routers and less than 3.43*1011 routing combinations.

When these weaknesses are exploited, not only can the source of a communication be intercepted and identified, but the physical location of the sender can be identified as well. These drawbacks are causing online privacy pundits to look for a better approach to anonymous browsing and communications.

Online privacy is not something just for people that need to be anonymous because they are engaging in illegal behavior, online privacy is for everyone. Similar to a credit report, companies are collecting huge amounts of data on us and using this data to make future decisions about an individual, e.g., decisions regarding future jobs, college enrollment, personal relationships, insurance premiums, associations, what information is marketed to the individual, where the individual lives, etc. Unlike a credit report, in the United States today there are very little regulations and oversight to stop discrimination, provide opportunities to correct invalid entries, or even get a copy of an individual's report. With so much data in reports, e.g., websites that have ever visited, health and medical information, GPS locations that have traveled to since owning a smart phone, emails, text messages, phone calls, apps, political and religious affiliations, social media posts and who you follow, and shopping habits, governments or lawyers can cherry pick the data to concoct nearly any story desired about a person that is very difficult to disprove. Until online privacy regulations catch up and "character reports" have the same level of consumer protections as credit reports, it is important that individuals be able to limit the amount of digital breadcrumbs left behind.

Based on the above discussion, there is a need for new methods and apparatus for supporting communications, e.g., secure anonymous communications.

SUMMARY

Communications methods and apparatus are described. The methods and/or apparatus facilitate an individual being able to communicate over the Internet and/or another public network in a manner that is difficult or impossible to track and/or which prevents the party being communicated with from determining the true identify of the party initiating the communication.

In various embodiments a user can browse the Internet or communicate with another device from their own device such as a personal computer or smart phone via a virtual device, e.g., a virtual desktop created on a server, e.g., a network server. With each session initiated by the user from their user device, a new virtual communications device is created by a processor in the network server. As part of creating the virtual communications device a set of device attributes is generated, e.g., fabricated, and allocated to the virtual communications device. The fabrication of the set of device attributes, e.g., MAC address, IP address, User Agent, Operating System, Device ID, Advertising ID, mobile carrier, GPS location, screen size and resolution, may be done in a random or pseudo random manner but is constrained to result in a set of device attributes which might be expected of an actual physical device that might be used for communications.

The processor acting as a virtual machine serves as a communications end point for a communications session with the device or devices with which the user seeks to communicate. The virtual machine runs a secure operating system configured for anonymity, e.g., Tails OS, SubGraph OS, IprediaOS. Some or all of the set of attribute information maybe provided from the processor acting as a virtual device to the other communications end point during a communications session. However, given that a new set of device attributes will be generated for each session in some embodiments and given that the attribute information is generated in some embodiments pseudo randomly or randomly, such information is of limited use as a fingerprint to identify the actual user device. This is because the device attributes include information that is changed from session to session and in some embodiments intentionally includes information different from that of a true set of attribute information corresponding to the user device. In addition, any data saved to the virtual machine that can be used for tracking or fingerprinting, e.g., cookies, local storage data, is deleted along with the virtual machine at the end of the communications session.

In addition to fabricating device attribute information from one session to another, in some embodiments routing of communications is preformed through multiple routers of a service provider network, e.g., a private service provider network using onion routing. The routers and thus the communications path through the network is altered from session to session and potentially during a communications session. The use of onion routing makes it difficult to determine the path through the network being used and thus difficult for a device which might intercept a packet to identify the source of the packet sent as part of a communications session.

In some embodiments the routers used for onion routing are those of a communications service provider which provides access to the Internet. Thus the packets of the communications session are protected by not only the use of onion routing but also, in some embodiments, by the fact that they will be sent over a communications service provider network which is also routing a large volume of other traffic through the routers being used to support the communication by the virtual machine. The private service provider is responsible for maintaining the routers and for monitoring for potential tampering. Given the large number of routers which are maintained by an Internet service provider, the number of routing possibilities can be far greater than in the case of smaller set of onion routers maintained by volunteers. Furthermore since the routers are maintained by the private service provider, they are more likely to be reliable and tampering with such routers is more easily detected and/or prevented in part by the fact that such routers are under the control and often at the site or sites of the private communications service provider.

By supporting secure communication via a server which operates as one or more virtual machines and by using a private onion router network to access the Internet and/or communicate with other devices a high degree of privacy can be achieved and the ability to track or identify a user over time is minimized. Since cookies and/or other session information, including device attribute information is deleted and/or changed after each session as the virtual machine used for the session is eliminated and a new one created for the next communications session, privacy can be maintained and the risk of tracking minimized.

Since the device attribute information and other information is generated in a manner that results in a set of attributes and/or other information that might be expected from a physical device, the end point of a communications session may not even be aware that it is interacting with a processor operating as a virtual device.

In some embodiments screen size and/or other device information communicated by the processor acting as a virtual device may result in images, audio and/or other content being returned to the processor in a format which is not optimal or usable by the actual user device which initiated the establishment of the virtual device for purposes of a communications session. In such cases the processor acting as the virtual device, and appearing as a communications endpoint to the other device in the communication session, may transcode and/or modify the content or information received in the communications session prior to providing it to the actual user device so that it can be used, e.g., displayed on the screen of the user device or played by the user device. This may involve audio and/or video transcoding and/or modifying image sizes and/or resolution to take into account the actual attributes of the user device, e.g., actual screen size, which will be different in many or all cases from the fabricated attributes of the virtual device.

An exemplary communications method, in accordance with some embodiments, comprises: receiving, at a network server in a first communications network, a first communication session establishment signal from a first user device, said first communications session establishment signal being sent by said first user device as part of establishing communications with a second device; and allocating, at the network server, a first fabricated set of device attribute information including at least some values indicating one or more of: i) physical device information, ii) operating system information; or iii) application information to be indicated for a first communications device, to be used by for communications with the second device. In some such embodiments, the exemplary communications method further comprises: operating the first communications device to communicate with the second device on behalf of the first user device as a first communications end point in a communication in which the second device is a second communications end point, said first communications device being a processor in the network server, said step of operating the first communications device to communicate with the second device on behalf of the first user device including operating the first communications device to establish communications with the second device via a first communications path; providing at least some of said first fabricated set of device attribute information to the second device; and providing content obtained from the second device to the first user device.

An exemplary communications system, in accordance with some embodiments, comprises: a network server in a first communications network, the network server including: i) a first interface configured to receive a first communication session establishment signal from a first user device, said first communications session establishment signal being sent by said first user device as part of establishing communications with a second device and ii) one or more processors configured to: allocate, at the network server, a first fabricated set of device attribute information including at least some values indicating one or more of: i) physical device information, ii) operating system information; or iii) application information to be indicated for a first communications device, to be used for communications with the second device; and operate as a first communications device to communicate with the second device on behalf of the first user device as a first communications end point in a communication in which the second device is a second communications end point. In some such embodiments, operating as the first communications device to communicate with the second device on behalf of the first user device includes: establishing communications with the second device via a first communications path; providing at least some of said first fabricated set of device attribute information to the second device; and providing content obtained from the second device to the first user device.

Numerous variations and benefits are possible as will be discussed further in the detailed description which follows.

BRIEF DESCRIPTION OF THE FIGURES

FIG. 5C is a third part of a signaling diagram illustrating an exemplary communications method including secure anonymous communications in accordance with an exemplary embodiment.

FIG. 5 comprises the combination of FIG. 5A, FIG. 5B and FIG. 5C.

FIG. 8D is a fourth part of a drawing of an assembly of components which may be included in an exemplary network server in accordance with an exemplary embodiment.

FIG. 8 comprises the combination of FIG. 8A, FIG. 8B, FIG. 8C, and FIG. 8D.

DETAILED DESCRIPTION

Figure 1:
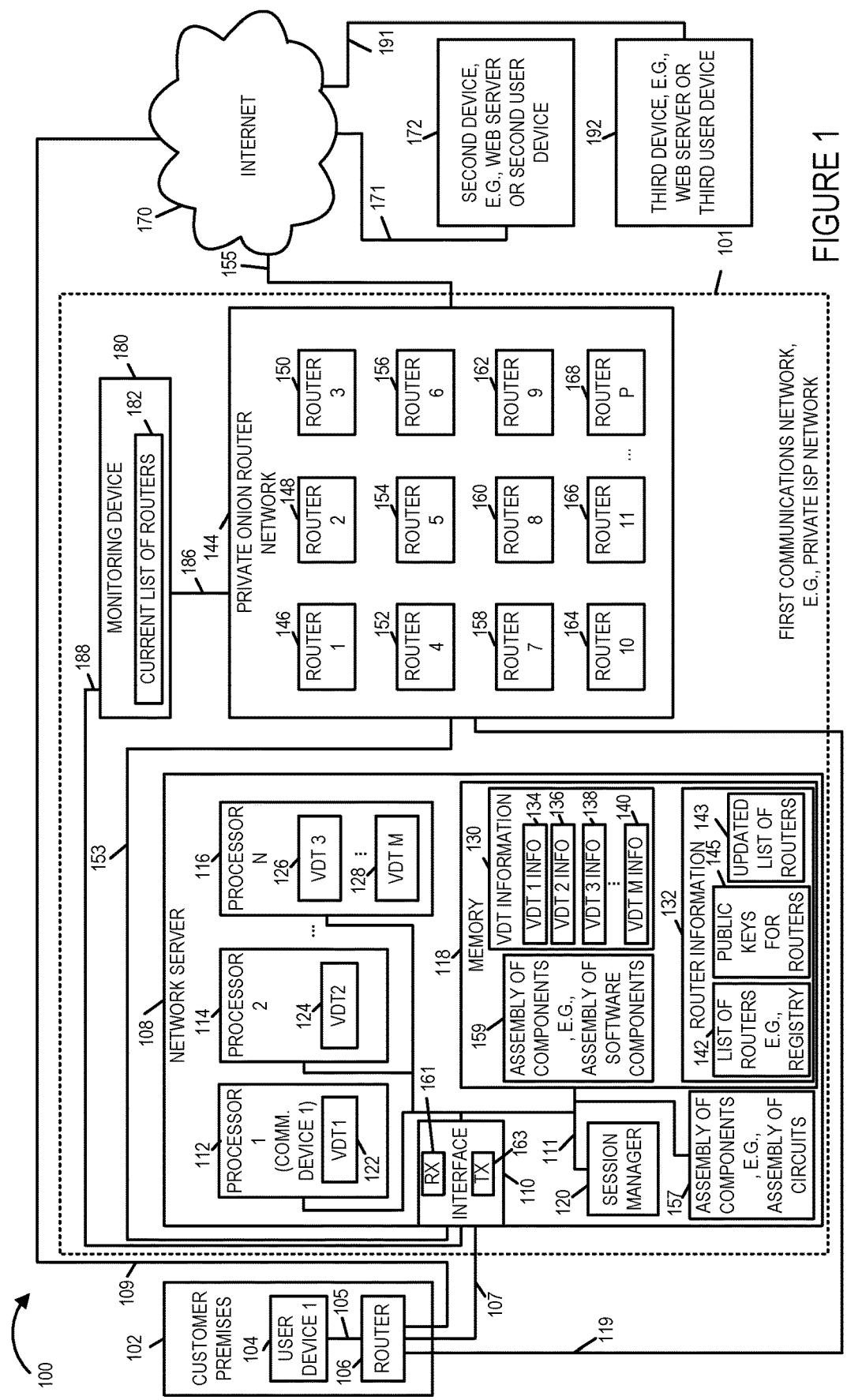
FIG. 1 is a drawing of an exemplary communications system, e.g., a communications system supporting secure anonymous communications, in accordance with an exemplary embodiment.

FIG. 1 is a drawing of an exemplary communications system, e.g., a communications system supporting secure anonymous communications, in accordance with an exemplary embodiment. Exemplary communications system 100 includes a first communications network 101, e.g., a private Internet Service Provider (ISP) network, a customer premises 102, Internet 170, a second device 172, e.g., a Web server or a second user device, and a third device 192, e.g., another Web server or a third user device, coupled together as shown in FIG. 1. First communications network 101 includes a network server 108, a private onion router network 144, and a monitoring device 180, e.g., a router monitoring device, coupled together as shown in FIG. 1. Network server 108 includes a plurality of processors (processor 1 112, processor 2 114, . . . , processor N 116), an interface 110 including a receiver 161 and a transmitter 163, a session manager 120, assembly of components 157, e.g., an assembly of hardware components, e.g., circuits, and memory 118 coupled together via a bus 111 over which the various elements may interchange data and information. Each processor (112, 114, . . . , 116) may, and sometimes does, include a virtual desktop (VDT). A created virtual desktop may, and sometimes does, operate as a communications device, e.g., a communications device endpoint for a communications session. For example, VDT 1 122 may, and sometimes does, operates as a first communications device, on behalf of first user device 104 for supporting communications with second device 172, and a communications session is established between VDT 1 122 and second device 172, with the user device 104 remaining anonymous with regard to second device 172. Some processors in the set of processors (112, 114, . . . , 116) may and sometimes do, include multiple virtual desktops concurrently. In FIG. 1, processor 1 112 is shown including virtual desktop 1 (VDT 1) 122, processor 2 114 is shown including virtual desktop 2 (VDT 2) 124, and processor N 116 is shown including virtual desktop 3 (VDT 3) 126 and VDT M 128. Memory 118 includes assembly of components 159, e.g., an assembly of software components, VDT information 130 and router information 132. VDT information 130 includes information corresponding to each of the currently implemented desktops (VDT 1 information 134, VDT 2 information 136, VDT 3 information 138, . . . , VDT M information 140). Each set of VDT information (134, 136, 138, . . . , 140) includes a fabricated set of device attribute information, and a router path, e.g., an onion router path. Router information 132 includes a list of routers 142, e.g., a registry of routers, e.g., a list of routers in private onion router network 144, and an updated list of routers 143, e.g., an updated registry of routers, e.g., a list of currently available routers based on information communicated from monitoring device 180. For example, list of currently available routers 143 does not include routers in network 144 which have been detected by monitoring device 180 to: have been tampered with, be currently malfunctioning or be currently inaccessible. Memory 118 also includes stored public keys 145 corresponding to the routers in the private onion router network 144. In some embodiments router information 132 is implemented as a database of routers.

Monitoring device 180, e.g., an onion router monitor, monitors the current status of the onion routers in network 144, e.g., detecting failures, tampering, malfunctions, communication accessibility problems and/or other router related problems. Monitoring device 180 generates a current list of routers, e.g., a current list of available routers which may be used, based on the monitoring results. Monitoring device 180 communicates the current list of routers 182 to network server 108, where it is stored as updated list of routers 143 and subsequently used when selecting a routing path for VDT for a communications session. Monitoring device 180 is coupled to private onion router network 144 via communications link 186. Monitoring device 180 is coupled to interface 110 of network server 108 via communications link 188.

Private onion router network 144 includes a plurality of onion routers (router 1 146, router 2 148, router 3 150, router 4 152, router 5 154, router 6 156, router 7 158, router 8 160, router 9 162, router 10 164, router 11 166, . . . , router P 168). Each router in private onion router network 144 has a public key and private key. The routers in network 144 are coupled together allowing messages to be communicated along selected routing paths through the network 144.

Customer premises 102 includes user device 1 104, e.g., a computer, smart phone, or other user communications device 104, which is coupled to router 106 via link 105. The router 106 at customer premises 102 is coupled to interface 110 of network server 101, via link 107, e.g., a secure communications link. User device 1 104 has an actual set of device attribute information. The actual set of device attribute information corresponding to user device 1 104 is hidden from the second device 172 and third device 192, when communicating via a virtual desktop, e.g., VDT 1 122 of processor 1 112, in network server 108 through the private onion router network 144.

Router 106 is coupled to Internet 170 via communications link 109, e.g., over which non-anonymous unsecured communications may be, and sometimes are communicated. Private onion router network 144 is coupled to interface 110 via communications link 153, and onion router network 144 is coupled to Internet 170 via communications link 155. Second device 172 is coupled to Internet 170 via communications link 171. Third device 192 is coupled to Internet 170 via communications link 191. In various embodiments, router 106 is part of the private onion router network 144 with a communications link 119 between router 106 and onion router network 144. In various embodiments, the private onion network 144 includes routers at multiple sites.

In some embodiments, the network server 108 is implemented in a distributed manner, e.g., as a cloud based system.

Figure 2A:
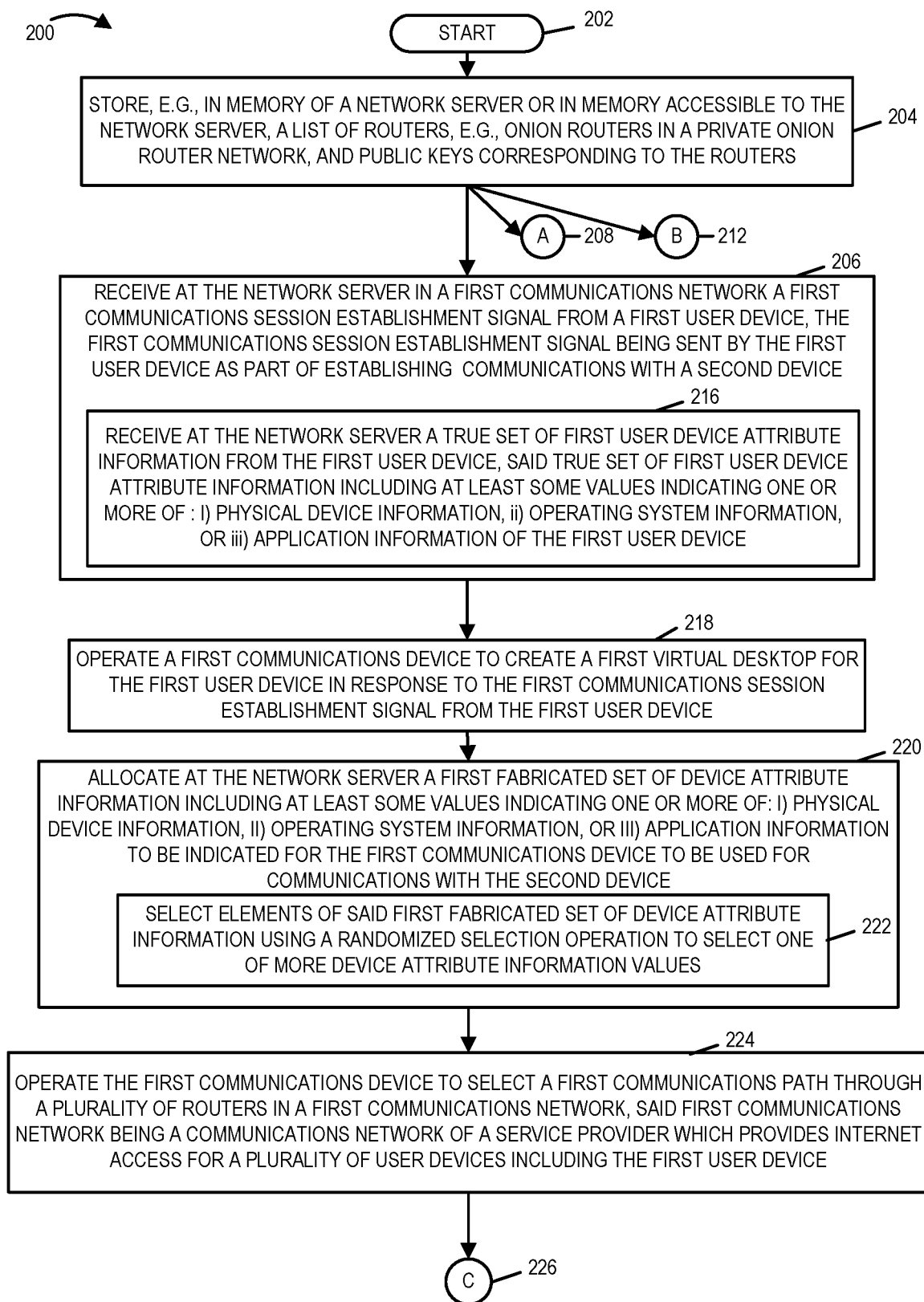
FIG. 2A is first part of a flowchart of an exemplary communications method in accordance with an exemplary embodiment.
Figure 2B:
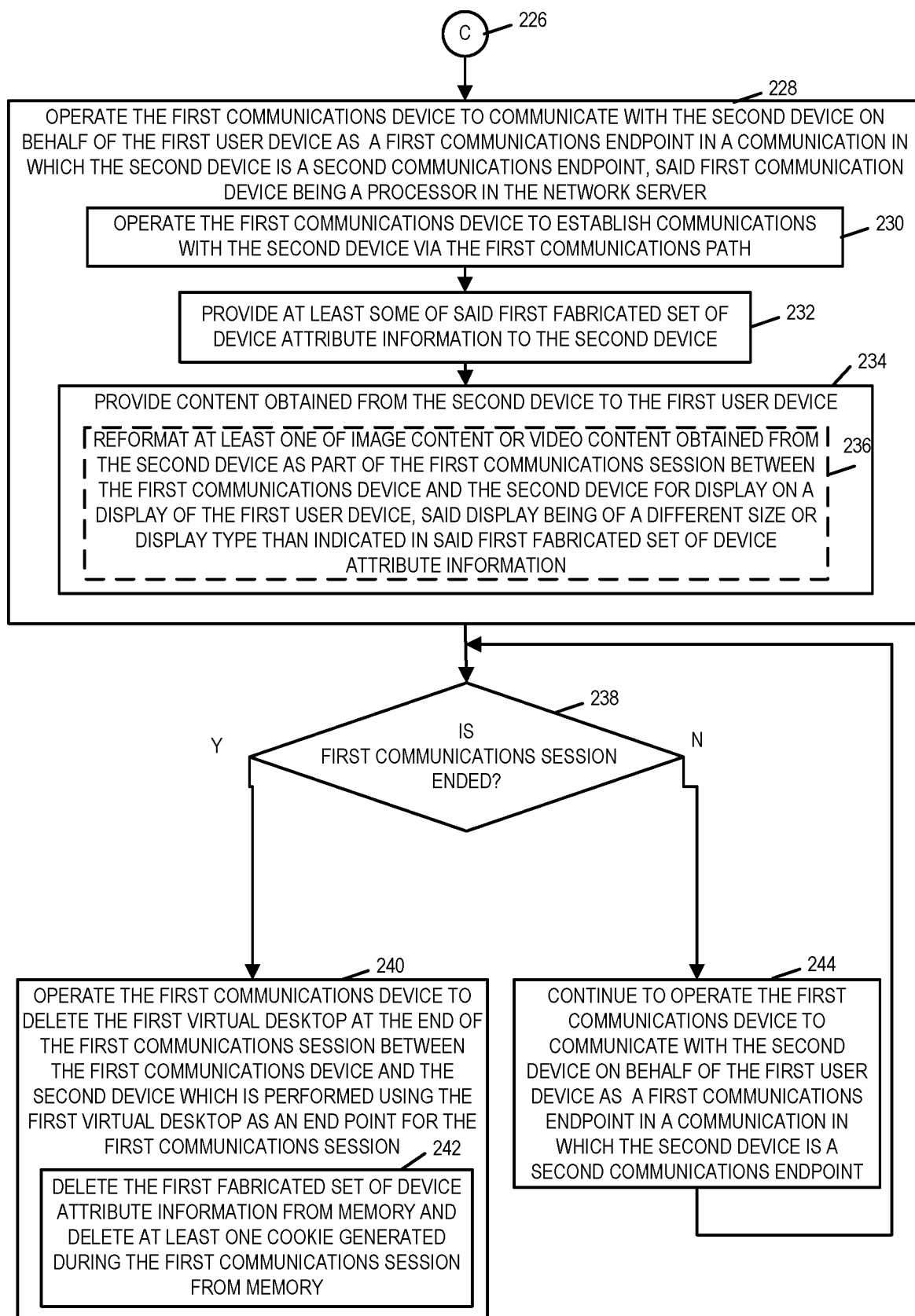
FIG. 2B is second part of a flowchart of an exemplary communications method in accordance with an exemplary embodiment.
Figure 2C:
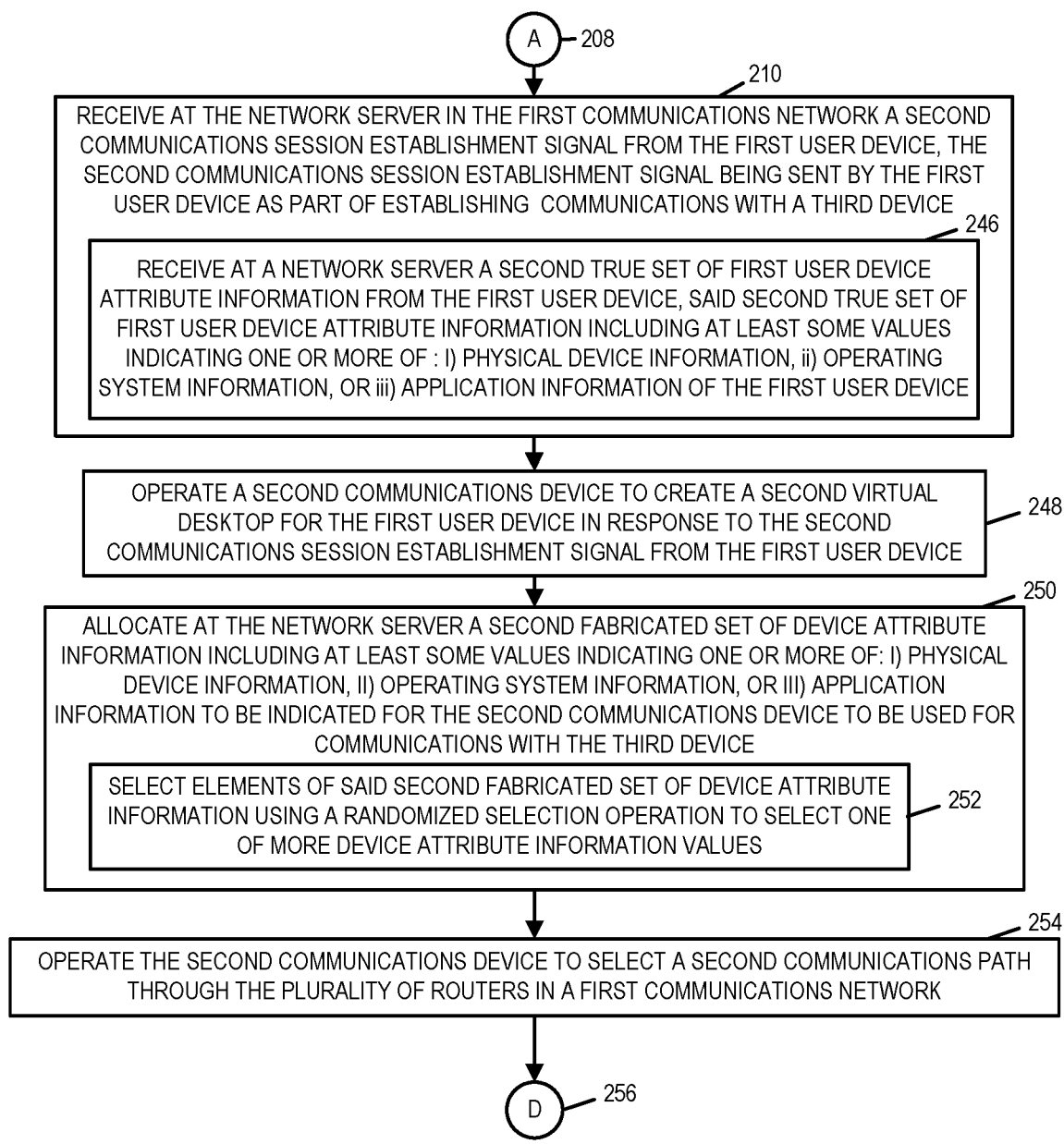
FIG. 2C is third part of a flowchart of an exemplary communications method in accordance with an exemplary embodiment.
Figure 2D:
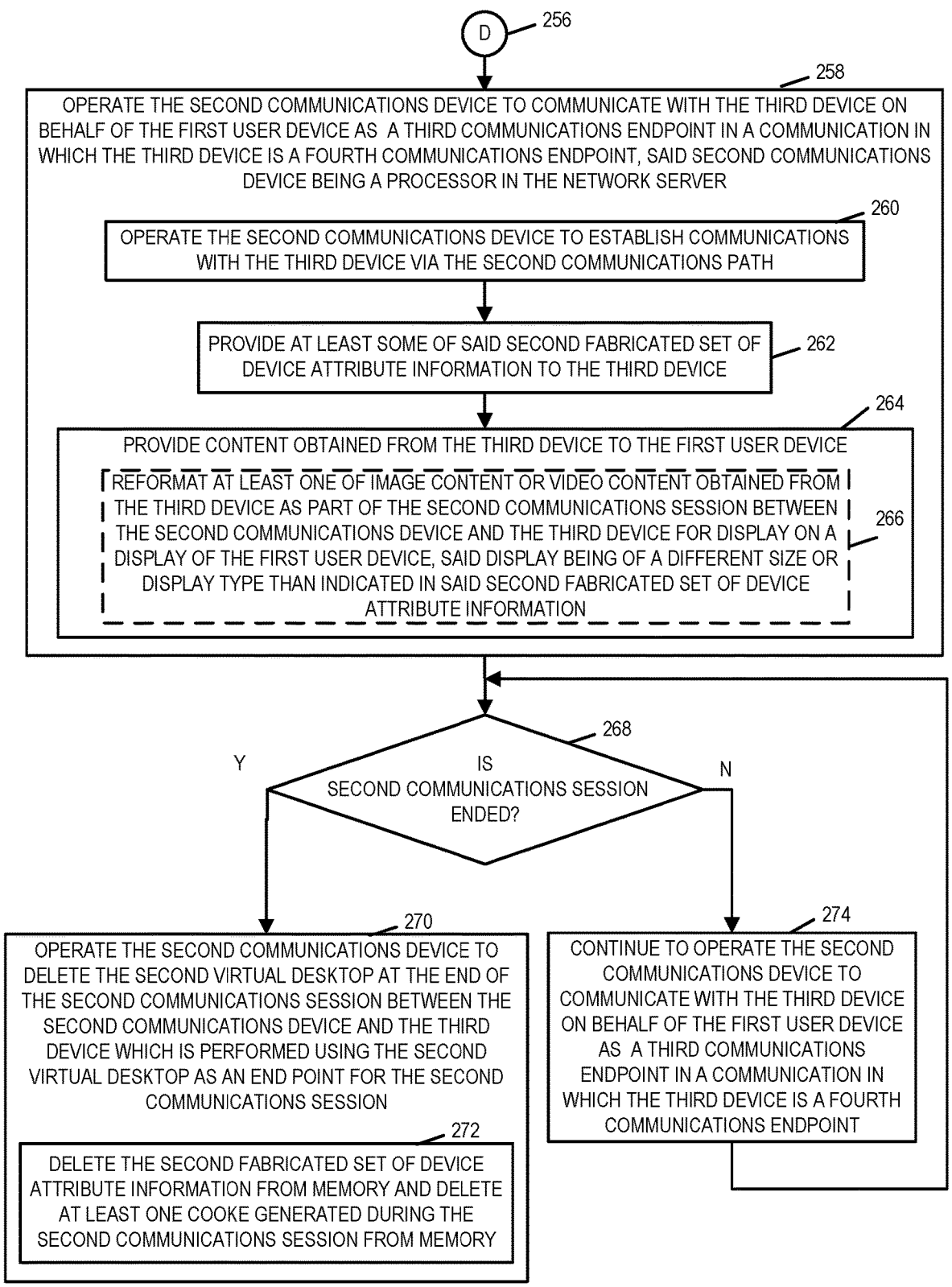
FIG. 2D is fourth part of a flowchart of an exemplary communications method in accordance with an exemplary embodiment.
Figures 2, 2E:
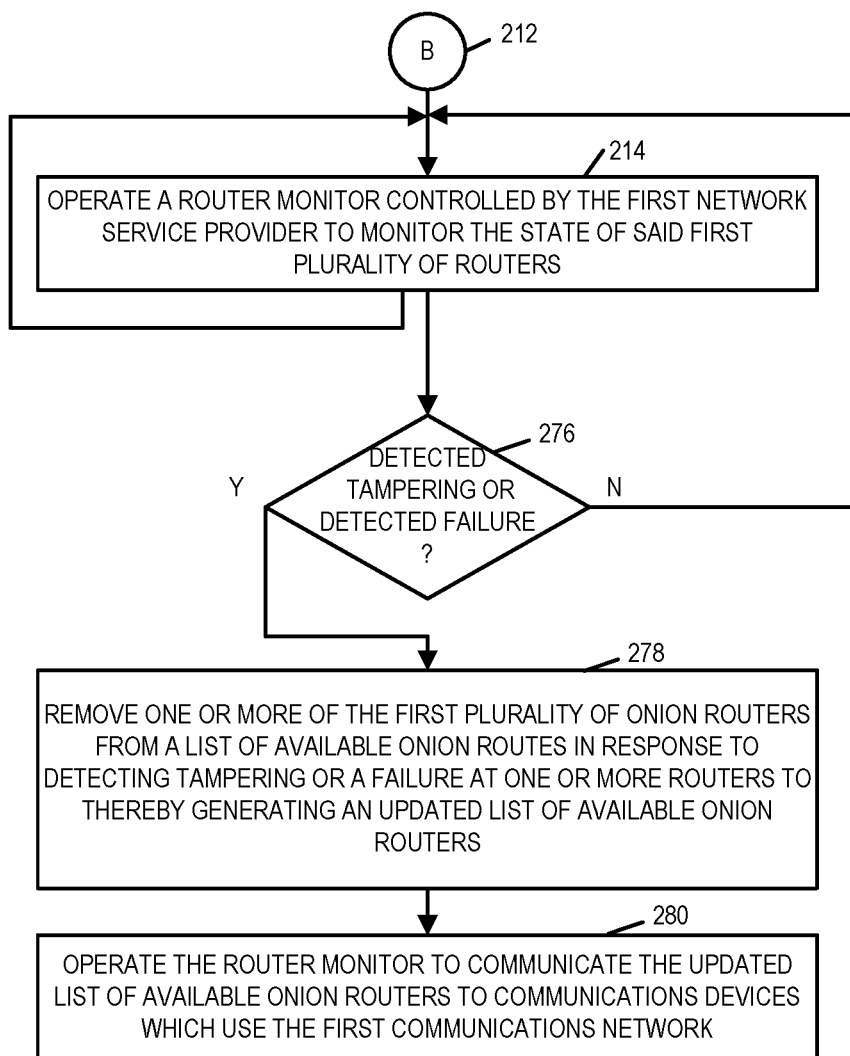
FIG. 2E is fifth part of a flowchart of an exemplary communications method in accordance with an exemplary embodiment.
FIG. 2 comprises the combination of FIG. 2A, FIG. 2B, FIG. 2C, FIG. 2D and FIG. 2E.

FIG. 2, comprising the combination of FIG. 2A, FIG. 2B, FIG. 2C, FIG. 2D and FIG. 2E, is a flowchart 200 of an exemplary communications method in accordance with an exemplary embodiment. Operation starts in step 200 and proceeds to step 202. In step 202 a list of routers, e.g., onion routers, and public keys corresponding to the list of routers is stored in memory of a network server or in memory accessible to the network server. In one exemplary embodiment, network server 108 stores list of routers 142, corresponding to the routers in private onion router network 144, and public keys 145 corresponding to the list of routers 142, in memory 118. In some embodiments, the list or routers 142 and public keys 145 are stored as part of a configuration operation of the network server 108 of the first communications network 101. Operation proceeds from step 204 to step 206, to step 210 via connecting node A 208, and to step 214 via connecting node B 212.

In step 206 the network server, e.g., network server 108, in a first communications network, e.g., first communications network 101, receives a first communications session establishment signal from a first user device, e.g. user device 1 104, the first communications session establishment signal being sent by the first user device as part of establishing communications, e.g., anonymous communications, with a second device, e.g., second device 172. In some embodiments, the first communications session establishment signal is a request for establishment of a session including a new virtual desktop device which can be used to communicate with one or more other devices over the Internet such as in a browser session or web page lookup.

Step 206 includes step 216. In step 216 the network server receives a first true set of first user device attribute information from the first user device, said first true set of first user device attribute information including at least some values indicating one or more of: i) physical device information, e.g., screen size, screen type, mobile device or PC, device brand, memory amount, processor type, etc., ii) operating system information, or iii) application information of the first user device. In some embodiments, the first true set of first user device attribute information is communicated to the network server in a separate message or messages from the first communications session establishment signal. Operation proceeds from step 206 to step 218.

In step 218 a first communication device, e.g., processor 1 112, is operated to create a first virtual desktop, e.g., VDT 1 122, for the first user device in response to the first communications session establishment signal from the first user device. In some embodiments, the first communications device is operated to create the first virtual desktop under the control of a session manager, e.g., session manage device 120. Operation proceeds from step 218 to step 220.

In step 220 the network server allocates a first fabricated set of device attribute information including at least some values indicating one or more of: i) physical device information, ii) operating system information, or iii) application information to be indicated for a first communications device to be used for communicating with the second device. In some embodiments, the first fabricated set of device attribute information includes, e.g., information about the characteristics of a device such as operating system, screen size, set of installed applications, processor type, MAC address, etc. In some embodiment, the physical device information includes, e.g., screen size, screen type, mobile device or PC, memory amount, processor type, etc. Step 220 includes step 222, in which the network server selects elements of said fabricated set of device attribute information using a randomized selection operation to select one or more device attribute information values. In one exemplary embodiment, VDT 1 122 of processor 1 112 performs the allocation of step 220 and the selection of step 222. In some embodiments, the randomized selection operation selects at least one of a MAC ID, screen size, operating system type, processor id, processor speed, set of applications on the device, or device location. In some embodiments, the randomized selection is a constrained randomized selection in which the device attribute information values which are selected for the first fabricated set are device attribute information values which represent compatible device attributes of capabilities that could be expected in an actual physical device of a device type indicated by a device type indicated in a device type value selected to be included in said first fabricated set of device attribute information. In some embodiments, the constrained randomized selection is further constrained to restrict the first fabricated set of device attribute information to include one or more device type values which are different from corresponding device type values of said first user device, e.g., the network server prevents one or more device attributes in the first fabricated set of device attribute information from matching the attribute values found in the first true set of first user device attribute information. In some embodiments, the first fabricated set of device attribute information includes at least two of a MAC address, a processor identifier value, a screen size value or an operating system value which provides information which is different from the corresponding information for the first user device, e.g., the first fabricated set of device attribute information intentionally includes what would be considered false of inaccurate information if it was interpreted as describing the first user device.

Operation proceeds from step 220 to step 224. In step 224, the first communications device, e.g., processor 1 112, is operated to select a first communications path through a plurality of routers in a first communications network, said first communications network, e.g., network 101, being a communications network of a service provider which providers Internet access for a plurality of user devices including the first user device, e.g., including device 104. In one exemplary embodiment VDT 1 122 of processor 112 selects the first communications path. In some embodiments, the first communications path is a path through private onion router network 144 which includes selected routers from the updated list of routers 143. Operation proceeds from step 224, via connecting node C 226, to step 228.

In step 228, the first communication device, e.g., processor 1 112, is operated to communicate with the second device, e.g., device 172, on behalf of the first user device, e.g., user device 1 104, as a first communications endpoint in a communication in which the second device is a second communications endpoint, the first communication device being a processor, e.g., processor 1 112, in the network server, e.g., network server 108. Step 228 includes steps 230, 232 and 234.

In step 230 the first communications device is operated to establish communications with the second device via the first communications path. Operation proceeds from step 230 to step 232. In step 232 the first communications device is operated to provide at least some of said first fabricated set of device attribute information to the second device. Operation proceeds from step 232 to step 234. In step 234 the first communications device is operated to provide content obtained from the second device to the first user device. Step 234 may, and sometimes does, include step 236. In step 236 the first communications device reformats at least one of image content or video content obtained from the second device as part of the first communications session between the first communications device and the second device for display on a display of the first user device, said display being of a different size or display type than indicated in said first fabricated set of device attribute information.

Operation proceeds from step 228 to step 238. In step 238 the first communications device determines if the first communications session has ended. If the determination is that the first communications session has ended, then operation proceeds from step 238 to step 240; otherwise, other proceeds from step 238 to step 244. In step 240 the first communications device is operated to delete the first virtual desktop at the end of the first communications session between the first communications device and second device which is performed using the first virtual desktop as an end point for the first communications session. Step 240 includes step 242 in which the first communications device is operated to delete the first fabricated set of device attribute information form memory, e.g., from VDT 1 information 134 in memory 118, and delete at least one cookie generated during the first communications session from memory, e.g., from memory 118.

Returning to step 244, in step 244 the first communications device is operated to continue to communication with second device on behalf of the first user device as a first communications endpoint in a communication in which the second device is a second communications endpoint. Operation proceeds from step 244 to the input of step 238 for another check as to where the first communications session has ended. The first communications session may end for various reasons including: a maximum session time limit has been reached, the first user device has decided to end the session, the first communications device has decided to end the session, the second device has decided to end the session, or a device is unresponsive for a predetermined length of time. In some embodiments, the maximum session time limit is based on the number of onion routers in the selected first communications path.

Returning to step 210, in step 210 the network server, e.g., network server 108, in the first communications network, e.g., first communications network 101, receives a second communications session establishment signal from the first user device, e.g. user device 1 104, the second communications session establishment signal being sent by the first user device as part of establishing communications, e.g., anonymous communications, with a third device, e.g., third device 192. In some embodiments, the second communications session establishment signal is a request for establishment of a session including a new virtual desktop device which can be used to communicate with one or more other devices over the Internet such as in a browser session or web page lookup.

Step 210 includes step 246. In step 246 the network server receives a second true set of first user device attribute information from the first user device, said second true set of first user device attribute information including at least some values indicating one or more of: i) physical device information, ii) operating system information, or iii) application information of the first user device. In some embodiment, the second true set of user device attribute information is communicated to the network server in a separate message or messages from the second communications session establishment signal. Operation proceeds from step 210 to step 248.

In step 248 a second communication device, e.g., processor 2 114, is operated to create a second virtual desktop, e.g., VDT 2 124, for the first user device in response to the second communications session establishment signal from the first user device. In some embodiments, the second communications device is operated to create the second virtual desktop under the control of a session manager, e.g., session manage device 120. Operation proceeds from step 248 to step 250.

In step 250 the network server allocates a second fabricated set of device attribute information, e.g., information about the characteristics of the virtual communications device such as the operating system, screen size, set of installed applications, processor type, MAC address, etc, including at least some values indicating one or more of: i) physical device information, e.g., screen size, screen type, mobile device or PC, device brand, memory amount, processor type, etc., ii) operating system information, or iii) application information to be indicated for the second communications device to be used for communicating with the third device. Step 250 includes step 252, in which the network server selects elements of said second fabricated set of device attribute information using a randomized selection operation to select one or more device attribute information values. In one exemplary embodiment, VDT 2 124 of processor 2 114 performs the allocation of step 250 and the selection of step 252.

Operation proceeds from step 250 to step 254. In step 254, the second communications device, e.g., processor 2 114, is operated to select a second communications path through a plurality of routers in a first communications network, said first communications network, e.g., network 101, being a communications network of a service provider which providers Internet access for a plurality of user devices including the first user device, e.g., device 104. In one exemplary embodiment VDT 2 124 of processor 2 114 selects the second communications path. In some such embodiments, the second communications path is a path through private onion router network 144 which includes selected routers from the updated list of routers 143. Operation proceeds from step 254, via connecting node D 256, to step 258.

In step 258, the second communication device, e.g., processor 2 114, is operated to communicate with the third device, e.g., device 192, on behalf of the first user device, e.g., user device 1 104, as a third communications endpoint in a communication in which the third device is a fourth communications endpoint, the second communication device being a processor, e.g., processor 2 114, in the network server, e.g., network server 108. Step 258 includes steps 260, 262 and 264.

In step 260 the second communications device is operated to establish communications with the third device via the second communications path. Operation proceeds from step 260 to step 262. In step 262 the second communications device is operated to provide at least some of said second fabricated set of device attribute information to the third device. Operation proceeds from step 262 to step 264. In step 264 the second communications device is operated to provide content obtained from the third device to the first user device. Step 264 may, and sometimes does, include step 266. In step 266 the second communications device reformats at least one of image content or video content obtained from the third device as part of the second communications session between the second communications device and the third device for display on a display of the first user device, said display being of a different size or display type than indicated in said second fabricated set of device attribute information.

Operation proceeds from step 258 to step 268. In step 268 the second communications device determines if the second communications session has ended. If the determination is that the second communications session has ended, then operation proceeds from step 268 to step 270; otherwise, other proceeds from step 268 to step 274. In step 270 the second communications device is operated to delete the second virtual desktop at the end of the second communications session between the second communications device and third device which is performed using the second virtual desktop as an end point for the second communications session. Step 270 includes step 272 in which the second communications device is operated to delete the second fabricated set of device attribute information from memory, e.g., from VDT 2 information 136 in memory 118, and delete at least one cookie generated during the second communications session from memory, e.g., from memory 118.

Returning to step 274, in step 274 the second communications device is operated to continue to communicate with third device on behalf of the first user device as a third communications endpoint in a communication in which the third device is a fourth communications endpoint. Operation proceeds from step 274 to the input of step 268 for another check as to whether the second communications session has ended. The second communications session may end for various reasons including: a maximum session time limit has been reached, the first user device has decided to end the session, the second communications device has decided to end the session, the third device has decided to end the session, or a device is unresponsive for a predetermined length of time. In some embodiments, the maximum session time limit is based on the number of onion routers in the selected second communications path.

Returning to step 214, in step 214 a router monitor, e.g. monitoring device 180, controlled by the first service provider network, e.g., network 101, is operated to monitor the state of said first plurality of routers, e.g., the routers in private onion router network 144. Step 214 is performed on a recurring basis. Operation proceeds from step 214 to step 276. In step 276 the router monitor determines if tampering has been detected or if a failure has been detected based on the monitoring of step 214. If tampering has been detected or a failure has been detected, then operation proceeds from step 276 to step 278; otherwise, operation proceeds from step 276 to the input of step 214. In step 278, the monitoring device removes one or more of the first plurality of onion routers from a list of available onion routers in response to detecting tampering or a failure at one or more routers to thereby generate an updated list of available routers, e.g., current list of routers 182. Operation proceeds from step 278 to step 280, in which the router monitor is operated to communicate the updated list of available onion routers to communications devices which use the first communications network, e.g., monitoring device 180 sends current list of routers 182 to network server 108 where the list 182 is stored as updated list of routers 143 and subsequently utilized by communications devices when selecting onion routers to be used in a communications path being established through the private onion router network 144.

In various embodiments, the routers in the first communications network, e.g., routers in private onion router network 144 in first communications network 101, are routers which support onion routing, each of the onion routers having a public key known to the first communications device and known second communications device and a private key which is not known to the first communications device and is not known to the second communications device.

In one exemplary embodiment, different sets of possible available routers are used in selecting the first and second communications paths, e.g., the first and second communications paths are selected at different times and different sets of routers are available at the two different selection times. In one exemplary embodiment, the list of routers used to select, e.g., in step 222, onion routers for the first communications path includes the routers in list of routers 142, e.g., none of the routers in network 144 are failing at that time. In one exemplary embodiment, an updated list of onion routers, which does not include some routers in network 144 because of detected failure conditions, is received by the network server prior to selection of the second communications path, and the step of operating the second communications device to select, e.g., in step 252, the second communications path through the first plurality of routers in the first communications network includes selecting for inclusion in the second communications path only routers listed in updated list of available onion routers, e.g., list 143, and not selecting routers which were removed from list of available onion routers.

In some embodiments, the first communications device and the second communications device are different virtual devices on the same processor in the network server. For example, the first communications device is VDT 3 126 on processor N 116 of network server 116 and the second communications device is VDT M 128 on processor N 116 of network server 108.

Figure 3:
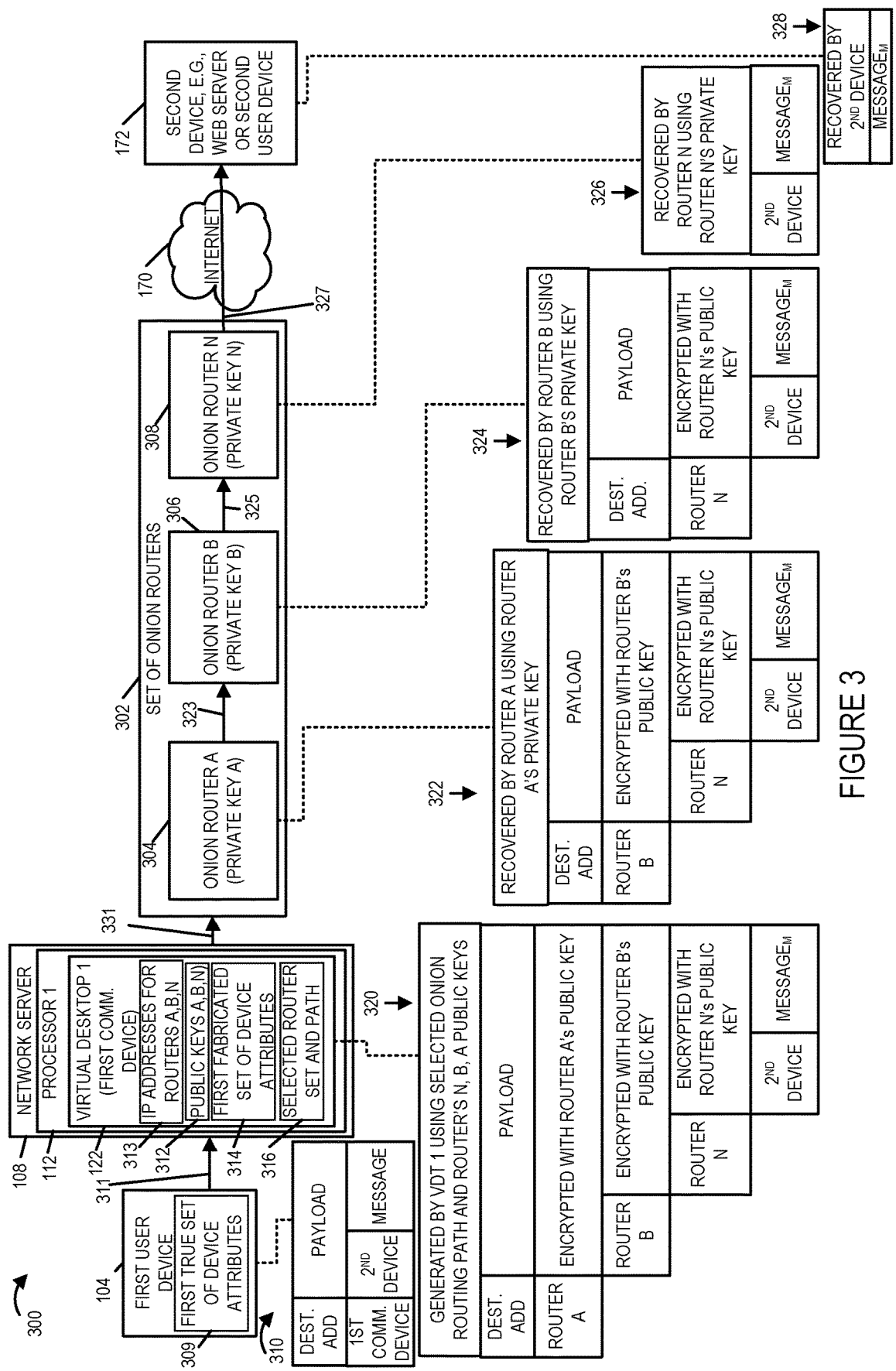
FIG. 3 is a drawing which illustrates exemplary signaling and exemplary onion router encryption and decryption in an exemplary communications system including a network server including a virtual desk top and a private onion router network.

FIG. 3 is a drawing 300 which illustrates exemplary signaling and exemplary onion router encryption and decryption in an exemplary communications system, said communications system including: i) a network server including a processor including a virtual desktop and ii) a private onion router network in accordance with an exemplary embodiment. Drawing 300 includes a first user device 104, network server 108, a set of onion routes 302 including onion router A 304, onion router B 306 and onion router N 308, Internet 170, and a second device 172, e.g., a web server or a second user device. The various devices (104, 108, 304, 306, 308, 172) are, e.g., devices of system 100 of FIG. 1, e.g., with onion routers (onion router A 304, onion router B 306, onion router N 308) being three selected routers from private onion router network 144.

First user device 104 includes a first true set of device attribute information 309. Network server 108 includes processor 1 112, which includes virtual desktop 1 VDT 1 122, which is a first communications device. VDT 1 122 includes or has access to IP addresses for Routers A, B and N 313 and public key information 312 (public key A, public key B and public key N) corresponding to onion routers (A, B, and N), respectively. VDT 1 122 does not have access to private key A, private key B and private key N corresponding to onion routers A, B, and N respectively.

VDT 1 122 has been created in response to a received session establishment request, e.g., for anonymous communications, from first user device 104. The created first VDT 1 122 is to serve, e.g., as a communications session endpoint, on behalf of the first user device 104. A first fabricated set of device attributes 314 has been selected, e.g., conditionally randomly selected, for VDT 1 122 and a set of onion routers and a routing path 316, e.g., routers A, B and N, and routing path router A→router B→router N, has been selected for communications between VDT 1 122 and second device 172. In various embodiments, the first fabricated set of device attribute information 314 intentionally includes at least some information which is different from the first true set of device attributes 309.

Information 310 indicates that first user device 104 generates a payload including: information identifying second device 172 as the intended recipient of a message being communicated and the message. Information 310 further includes a destination address, e.g., information identifying that the payload is directed to the first communications device, which is VDT 1 122. Arrow 311 represents the communication of the payload from first user device 104 to VDT 1 122. In various embodiments, the communication is over a secure link.

VDT 1 122 receives the payload and uses the public key information 312 and selected router path information 316 to encrypt the payload. In some embodiments, the received message may be modified, e.g., generating messageM, to take into account differences between the first true set of device attribute information 310 and the first fabricated set of device attribute information 314.

Block 320 illustrates that VDT 1 122 performs the following: encrypts the received payload or modified received payload using the public key for onion router N, adds the address of router N, encrypts using the public key for router B, adds the address for router B, encrypts using the public key for router A, and adds the address for router A.

The payload in information in generated information 320 is sent by VDT 1 122, as indicated by arrow 331, to onion router A 304, which receives the payload and performs decryption using private key A, recovering information 322.

The payload in recovered information 322 is sent by router A 304, as indicated by arrow 323, to onion router B 306, which receives the payload and performs decryption using its private key B recovering information 324.

The payload in recovered information 324 is sent by router B 306, as indicated by arrow, 325 to onion router N 308, which receives the payload and performs decryption using its private key N recovering information 326.

The unencrypted message, messageM is sent by router N 308, as indicated by arrow 327, to second device 172, which recovers information 328.

The second device 172 does not know that the first user device 104 is the original source of information included in the received message, and the true attributes of the first user device 104 have been hidden from the second device 172. The second user device 172 thinks that it is communicating with a user device having the attributes of first fabricated set of device attributes.

Figure 4:
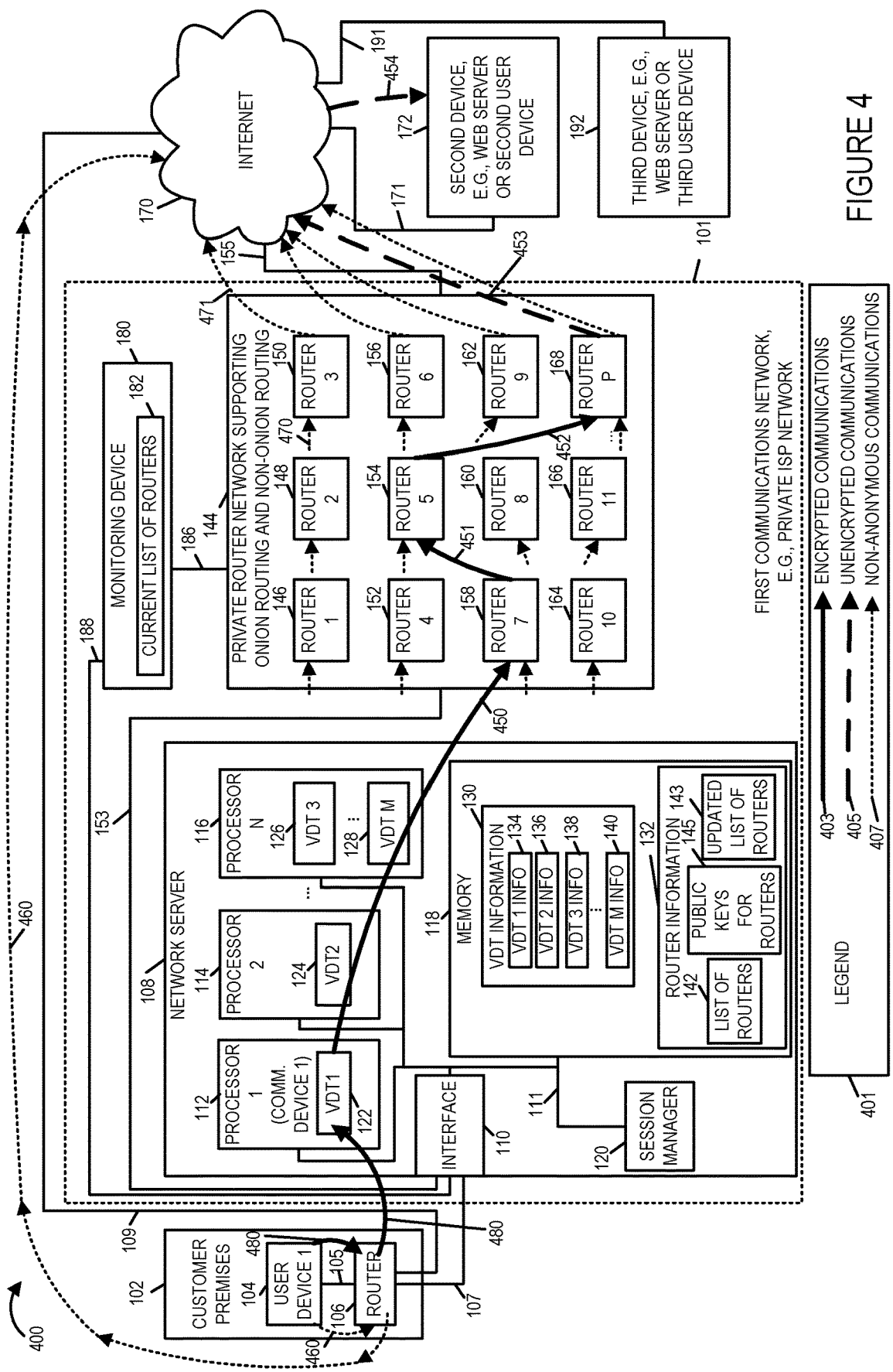
FIG. 4 is a drawing illustrating the communications system of FIG. 1 supporting exemplary encrypted communications, unencrypted communications, and non-anonymous communications in accordance an exemplary embodiment.

FIG. 4 includes a drawing 400 illustrating the communications system 100 of FIG. 1 supporting exemplary encrypted communications, unencrypted communications, and non-anonymous communications in accordance with an exemplary embodiment. FIG. 4 further includes legend 401 which identifies that solid line arrows 403 represents encrypted communications, dashed line arrows 405 represents unencrypted communications and dotted line arrows 407 represent non-anonymous communications.

Exemplary user device 1 104 sends unencrypted communications 460 to the Internet 170. The private router network 144 is used to support various unencrypted communications between the routers and to the Internet, e.g., signals 470, 471.

Exemplary user device 1 104 sends encrypted communications 480 via router 106 to VDT 1 122 of processor 1 112, e.g., via a secure communications link. Network server 108 has set up, in response to a request from user device 1 104, VDT 1 122 using processor 1 112 to support secure anonymous communications for user device 1 104 with second device 172. VDT 1 122 acts on behalf of user device 1 104 to support anonymous communications with second device 172. VDT 1 122 has a fabricated set of device attribute information which is different from the true set of device attribute information for user device 1 104. Virtual desktop 1 122 acts as an endpoint in a communications session with second device 172.

The communications corresponding to the communications session along the communications path segments (450, 451, 452) from VDT1 122 to router 7 158 to router 5 154 and to router P 168, respectively, are encrypted, e.g., using onion routing encryption. The communications regarding the communications session along the path segments (453, 454) between router P 168 and the Internet 170 and from the Internet 170 to second device 172, respectively, are unencrypted communications.

Figure 5A:
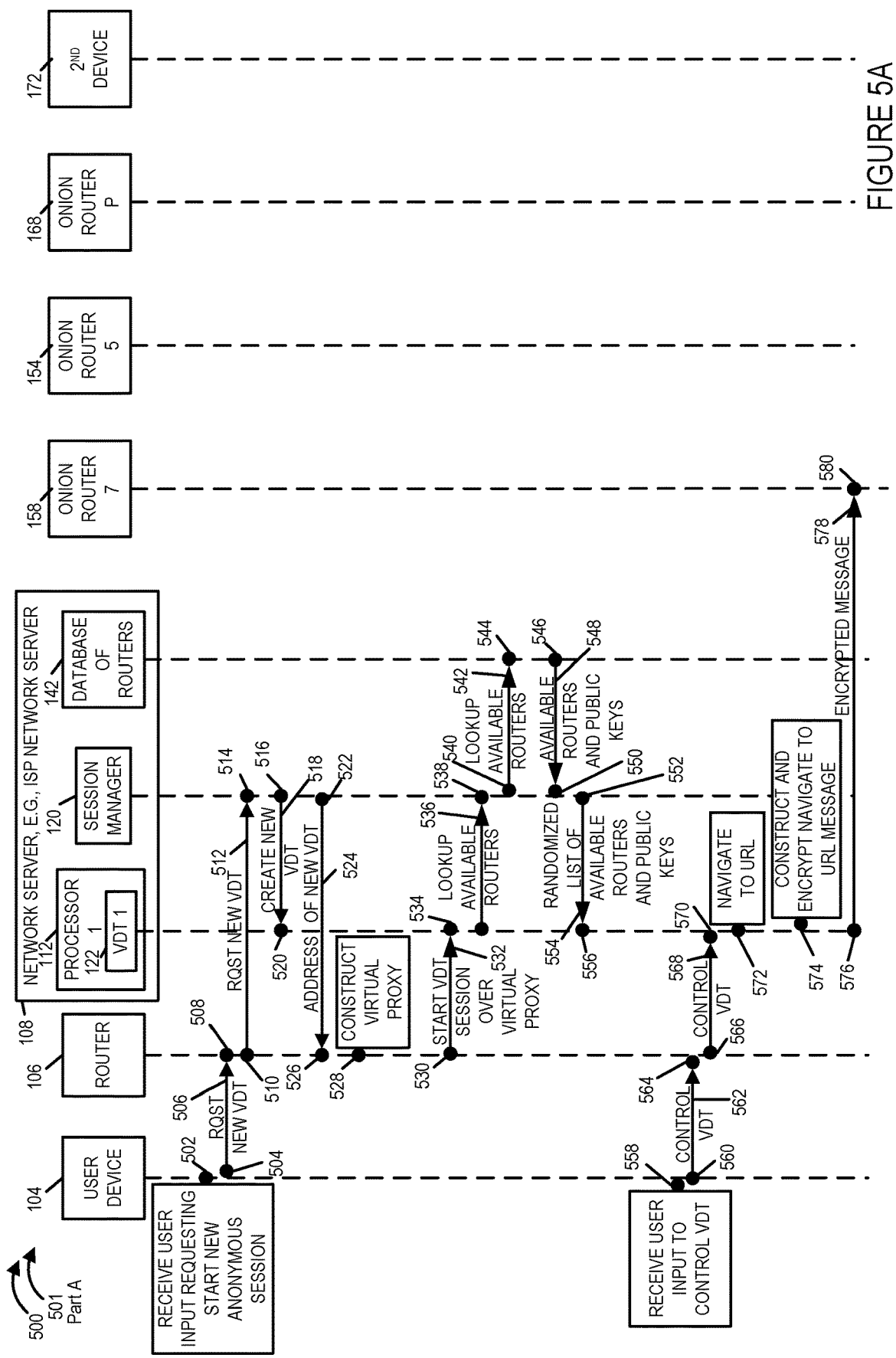
FIG. 5A is a first part of a signaling diagram illustrating an exemplary communications method including secure anonymous communications in accordance with an exemplary embodiment.
Figure 5B:
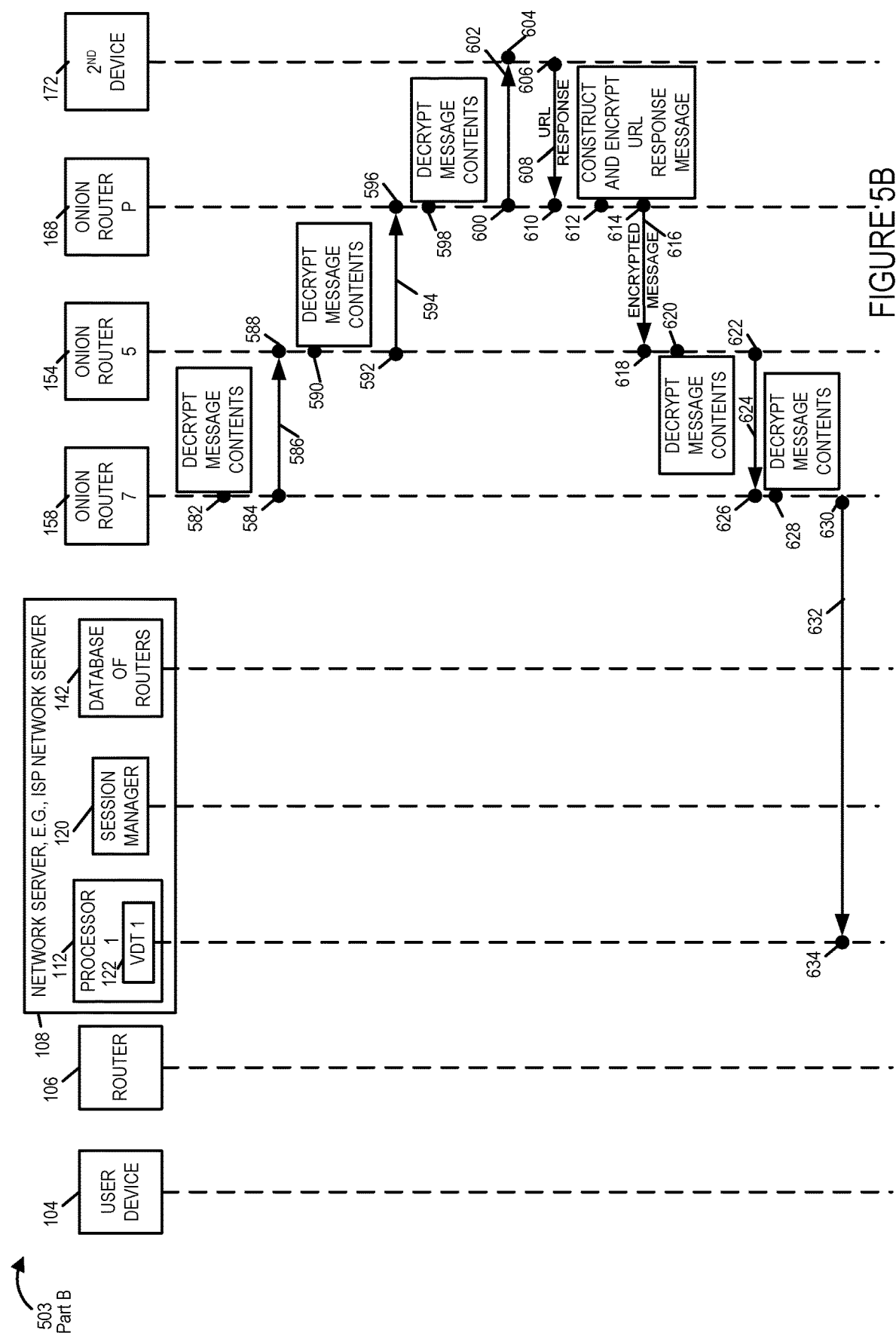
FIG. 5B is a second part of a signaling diagram illustrating an exemplary communications method including secure anonymous communications in accordance with an exemplary embodiment.

FIG. 5, comprising the combination of FIG. 5A, FIG. 5B and FIG. 5C, is a signaling diagram 500 comprising the combination of Part A 501, Part B 503 and Part C 505, illustrating an exemplary communications method including secure anonymous communications in accordance with an exemplary embodiment. Drawing 500 includes exemplary elements of system 100 of FIG. 1 including user device 104, router 106, ISP network server 108 including: processor 1 112, session manager 120, and router database 132, onion router 7 158, onion router 5 154, onion router P 168 and second device 172, e.g., a web server.

In step 502 user device 104 receives user input requesting the start of a new anonymous session. In step 504 user device 104 generates and sends request new virtual desktop message 506 to router 106, which receives message 506 in step 508 and forwards the message as request new desktop message 512 to session manager 120 of network server 108 in step 510. In step 514 session manager 120 receives the request for a new virtual desktop 512. In step 516, session manager 120 generates and sends create new desktop message 519 to processor 1 112. In step 520 processor 1 112 receives the create new desktop message 518 and in response creates virtual desktop VDT 1 122. In various embodiments, creating a new virtual desktop includes creating a fabricated set of device attributes for the VDT which is different from a set of actual device attributes for user device 104. In step 522 the session manager 120 sends a message 524 to router 106 communicating the address of the new VDT, e.g. the address of VDT 1 122. In step 526 router 106 receives message 524 and recovers the information communicated message 524. In step 528 router 106 constructs a virtual proxy. In step 530 router 106 generates and sends start VDT session over the virtual proxy message 532 to VDT 1 122 which is received by VDT 1 122 in step 534. In step 534, VDT 1 122 generates and sends lookup available routers message 536 to session manager 120, which is received in step 538 by the session manger 120 and forwarded in step 540 as message 542 to database of routers 132. In step 532 the database of routers 132 receives message 542 in step 544. In step 546 the database of routers 132 generates and sends message 548 communicating available routers and public keys corresponding to the available routers. In step 550 session manager 120 receives message 548, and recovers the communicated information. In step 552 the session manager generates and sends a randomized list of available routers and public keys 554 to VDT 1 122 which is received in step 556 by VDT 1 122.

In step 558 user device 104 receives user input to control the VDT. In step 560 user device 104 generates and sends control VDT message 562 to router 106, which is received by router 106 in step 564 and forwarded to VDT 1 122 as control VDT message 568 in step 566. In step 570 VDT 1 122 receives message 568 and recovers the communicated information. In step 572 VDT 122 navigates to the URL, e.g., determines a communications path to second device 172. In this example, VDT 1 122 determines that the path with be via onion router 7 168, onion router 5 154, and onion router P 168. In step 574 VDT 1 122 constructs and encrypts, e.g., using onion encryption and the public keys for onions routes 168, 154, and 158, a navigate to URL message. In step 578 VDT 1 122 sends the generated encrypted message 578 to router 7 158, which receives message 578 in step 580. In step 582 router 7 158 decrypts the received message 578 using its private key and recovers decrypted message contents including a destination address and an encryption portion. In step 584 router 7 158 forwards the recovered encrypted portion as message 586 to the recovered destination address which is router 5 154. In step 588 router 5 154 receives forwarded message 586, and in step 590 router 5 154 decrypts the received message 586 using its private key obtaining a destination address and an encrypted portion. In step 592 router 5 154 forwards the recovered encrypted portion to the recovered destination address, as message 594, which is received by router P 168 in step 596. In step 598 router P 168 decrypts the received message 594 using its private key obtaining a destination address which is the address of second device and an unencrypted message intended for the second device 172.

In step 600 router P 168 generates and sends the recovered message 602 to second device 172 and message 602, which is received by the second device 172 in step 604. In step 606 second device 172 generates and sends URL response message 608 to router P 168, which is received in step 610 by router P 168. In step 612 router P 168 constructs and encrypts URL response message 608 generated encrypted message 616. In step 614 router P 168 sends message 616 to router 5 154, which is received in step 618. In step 620 router 5 154 decrypts received message 616 obtaining decrypted message contents including a destination address and encrypted contents. In step 622 router 5 154 forwards the recovered encrypted contents, as message 624 to the destination address which is router 7 158. In step 626 router 7 158 receives message 624. In step 628 router 7 158 performs decryption using its private key obtaining decrypted message contents and a destination address. In step 630 router 7 158 sends the decrypted message contents to VDT 1 122 as message 632, which is received by VDT 1 122 in step 634.

In step 636 VDT 1 122 renders the URL response.

In step 638 user device 104 receives user input indicating terminate the virtual proxy. In step 640 user device 104 generates and sends termination virtual proxy message 642 to router 106, which receives message 642 in step 644 and forwards the terminate proxy message as message 648 in step 646 to session manager 120. In step 650 the session manager 120 receives message 648, and in response in step 652 the session manager 120 destroys the virtual desktop, e.g., VDT 1 122 is destroyed. In some embodiments, destroying the virtual desktop VDT 1 122 includes sending a message to processor 1 112 commanding processor 1 112 to destroy VDT 1 122, deleting stored information in memory corresponding to VDT 1 122, e.g., VDT 1 information 134 in memory 118 of network server 108, and deleting one or more cookies corresponding to the communications session.

Figure 6:
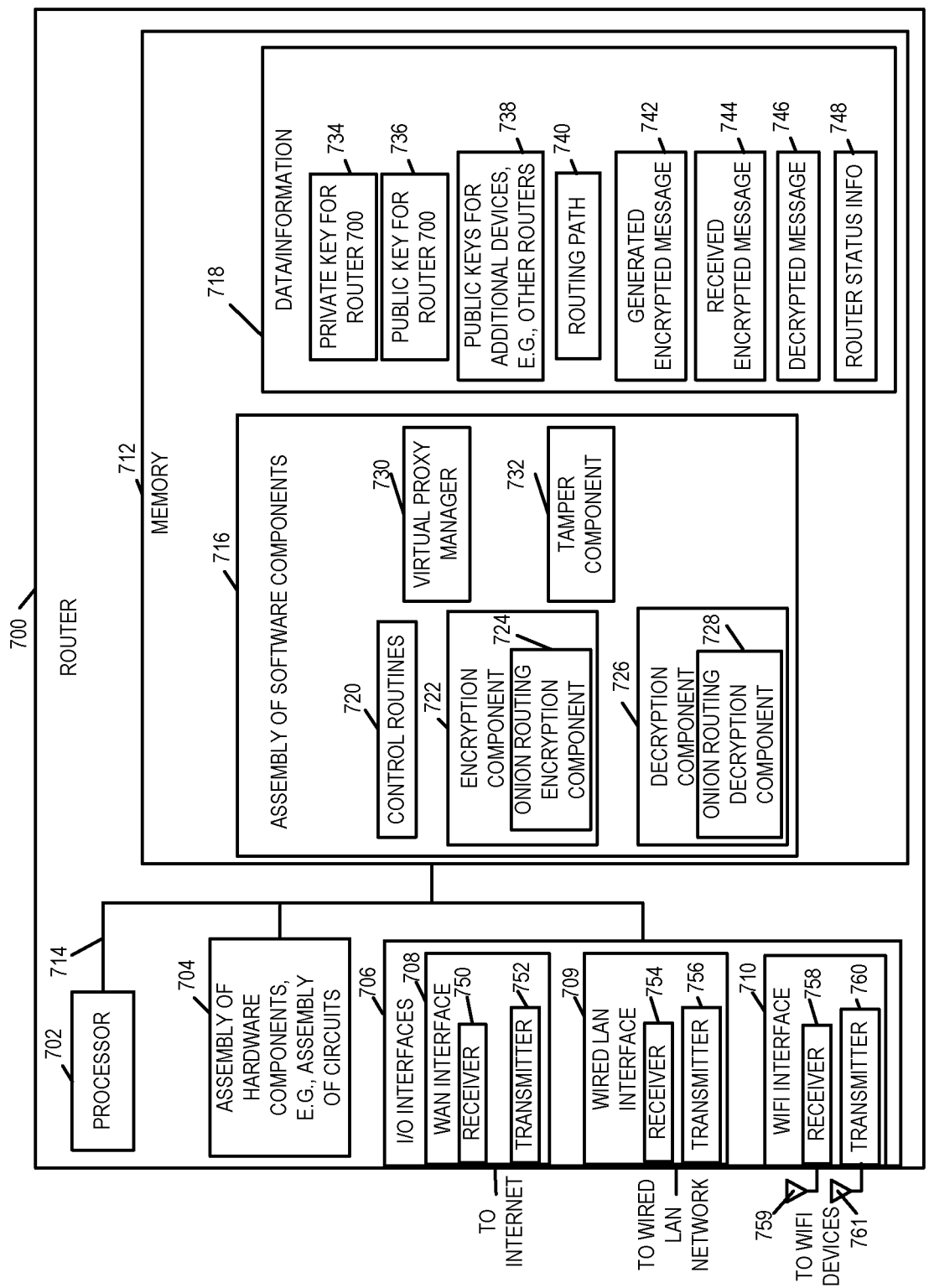
FIG. 6 is a drawing of an exemplary router in accordance with an exemplary embodiment.

FIG. 6 is a drawing of an exemplary router 700 in accordance with an exemplary embodiment. Router 700 is, e.g., any of the routers 106, 146, 148, 150, 152, 154, 156, 148, 160, 162, 164, 166, . . . , 168 shown in system 100 of FIG. 1.

Router 700 includes a processor 702, an assembly of hardware components 704, e.g., assembly of circuits, I/O interfaces 706 including a wide area network (WAN) interface 708, a wired local area network (LAN) interface 709 and a WIFI wireless interface 710, and memory 712 coupled together via a bus 714 over which the various elements may interchange data and information. WAN interface 708 includes a receiver 750 and a transmitter 752. LAN interface 709 includes a receiver 754 and a transmitter 756. WIFI interface 710 includes a receiver 758 coupled to receive antenna 759 and a transmitter 760 coupled to transmit antenna 761. WAN interface 708 couples router 700 to the Internet. Wired LAN interface 709 couples the router to a wired LAN network. WiFi interface 710 couples the router 700 to other WiFi devices. In various embodiments, router 700 includes a plurality of wired LAN interfaces. In some embodiments, router 700 includes a plurality of wireless interfaces, e.g., a plurality of WiFi interfaces. In some embodiments, the router 700 includes a plurality of wireless interfaces including different types of wireless interfaces, e.g. a WiFi interface and a Bluetooth Low Energy interface. Memory 712 includes assembly of software components 716 and data/information 718. Assembly of software components 716 includes control routines 720 configured to control operations of router 700 including communications with other devices including message forwarding to a next destination, an encryption component 722 configured to perform encryption of messages, a decryption component 726 configured to perform decryption of messages, a virtual proxy manager 730 configured to construct control and terminate a virtual proxy, and a tamper component 732 configured to monitor and detect tampering with regard to operations of router 700. Encryption component 722 includes an onion routing encryption component 724 configured to perform onion routing encryption using a determined routing path and a set of public keys corresponding to devices on the path. Decryption component 726 includes an onion routing decryption component 728 configured to perform onion routing decryption using its own private key.

Data/information 718 a private key 734 for router 700, a public key 736 for router 700, public keys for additional devices 738, e.g., public keys for other routers, a routing path 740, a generated encrypted message 742, a received encrypted message 744, a decrypted message 746 and router status information 748, e.g., information indicating that the router is operating problems free, or that a fault has been detected, or that tampering has been detected.

In some embodiments, one or more or all of the components in assembly of software components 716 is implemented as hardware, e.g., a circuit, in assembly of hardware components 704. In some embodiments, one or more or all of the components in assembly of software components 716 is implemented as hardware, e.g., a circuit, in processor 702.

Figure 7:
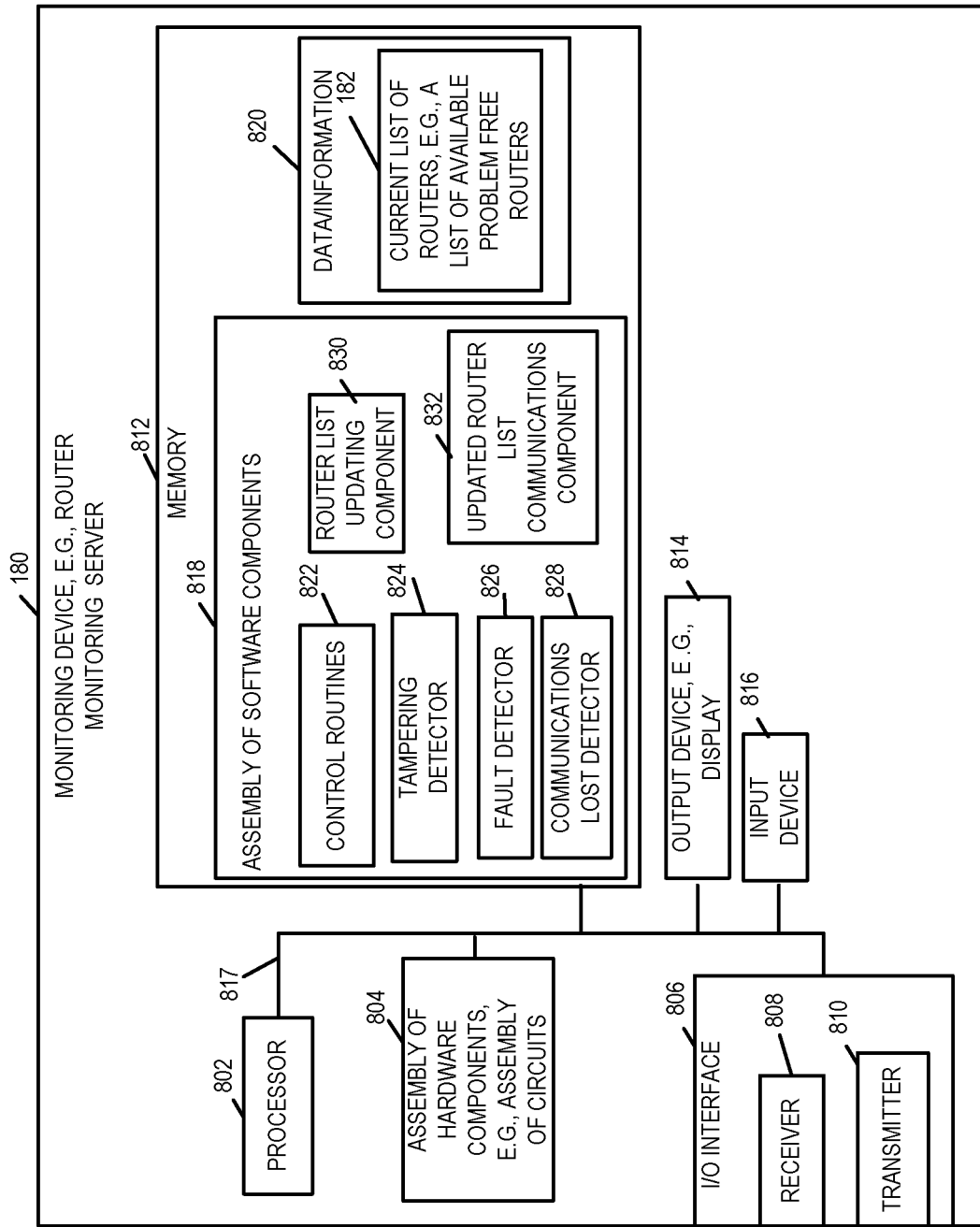
FIG. 7 is a drawing of an exemplary monitoring device, e.g., a router monitoring server for monitoring routers in a private ISP network, in accordance with an exemplary embodiment.

FIG. 7 is a drawing of an exemplary monitoring device 180, e.g., a router monitoring server, in accordance with an exemplary embodiment. Monitoring device 180 includes a processor 802, an assembly of hardware components 804, e.g., an assembly of circuits, an I/O interface 806 including a receiver 808 and a transmitter 810, a memory 812, an output device 814, e.g., a display, and an input device 816, e.g., a keyboard or mouse, coupled together via a bus 817 over which the various elements may interchange data and information.

Memory 812 includes assembly of software components 818 and data/information 820. Assembly of software components includes control routines 822 configured to control operation of monitoring device 180, a tampering detector 824 configured to detect tampering at a router and/or receive information indicating that tampering was reported to be detected by a router, a fault detector 826 configured to detect a fault with a router and/or receive information indicating that a router detected a fault, e.g., via its self-tests, and a communications lost detector 828 configured that communications with a router have been lost and/or have degraded to an unacceptable quality level. Assembly of software components 818 further includes a router updating component 830 configured to update the current list of routers 182 based on detected tampering, faults, and/or communications problems, e.g., removing a problem router from the list of available list in response to a detected problem and/or restoring a faulty router to the list in response to a determination that a detected problem with the router has been fixed or solved, and an updated router list communication component 832 configured to send the current list of routers 182 to other devices, e.g., to network server 108, e.g., in response to an update of the list 182 so that the other devices will have a current list of available routers available to use, e.g., for selecting a routing path. Data/information 820 includes current list of routers 182, e.g., a list of available problem free routers.

In some embodiments, one or more or all of the components in assembly of software components 818 is implemented as hardware, e.g., a circuit, in assembly of hardware components 804. In some embodiments, one or more or all of the components in assembly of software components 818 is implemented as hardware, e.g., a circuit, in processor 802.

FIG. 8 is a drawing of an exemplary assembly of components 900 which may be included in an exemplary network server, e.g., exemplary network server 108 of first communications network 101, e.g., a private ISP network, of communications system 100 of FIG. 1, in accordance with an exemplary embodiment. The components in the assembly of components 900 can, and in some embodiments are, implemented fully in hardware within one or more of processors 112, 114, . . . , 116, e.g., as individual circuits. The components in the assembly of components 900 can, and in some embodiments are, implemented fully in hardware within the assembly of hardware components 157, e.g., as individual circuits corresponding to the different components. In other embodiments some of the components are implemented, e.g., as circuits, within one or more of processor 112, 114, . . . , 116 with other components being implemented, e.g., as circuits within assembly of components 157, external to and coupled to the processor(s) 112, 114, . . . , 116. As should be appreciated the level of integration of components on the processor(s) and/or with some components being external to the processor(s) may be one of design choice. Alternatively, rather than being implemented as circuits, all or some of the components may be implemented in software and stored in the memory 118 of the network device 108, with the components controlling operation of network server 108 to implement the functions corresponding to the components when the components are executed by a processor or processor, e.g., processor 112, processor 114 and/or processor 116. In some such embodiments, the assembly of components 900 is included in the memory 118 as assembly of software components 159. In still other embodiments, various components in assembly of components 900 are implemented as a combination of hardware and software, e.g., with another circuit external to the processor providing input to the processor which then under software control operates to perform a portion of a component's function.

When implemented in software the components include code, which when executed by a processor, e.g., processor 112, processor 114 or processor 116, configure the processor to implement the function corresponding to the component. In embodiments where the assembly of components 900 is stored in the memory 118, the memory 118 is a computer program product comprising a computer readable medium comprising code, e.g., individual code for each component, for causing at least one computer, e.g., processor 112, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the network server device 108 or elements therein such as the processor 112 or processor 114, to perform the functions of corresponding steps illustrated and/or described in the method of one or more of the flowcharts, signaling diagrams and/or described with respect to any of the Figures. Thus the assembly of components 900 includes various components that perform functions of corresponding one or more described and/or illustrated steps of an exemplary method, e.g., one or more steps of the method of FIG. 2.

One or more of the components in assembly of components 900 may be implemented in its entirety or in part in any of processors (112, 114, . . . , 116), in session manager device 120, in interface 110, in assembly of hardware components 157, or in assembly of software components (159).

Figure 8A:
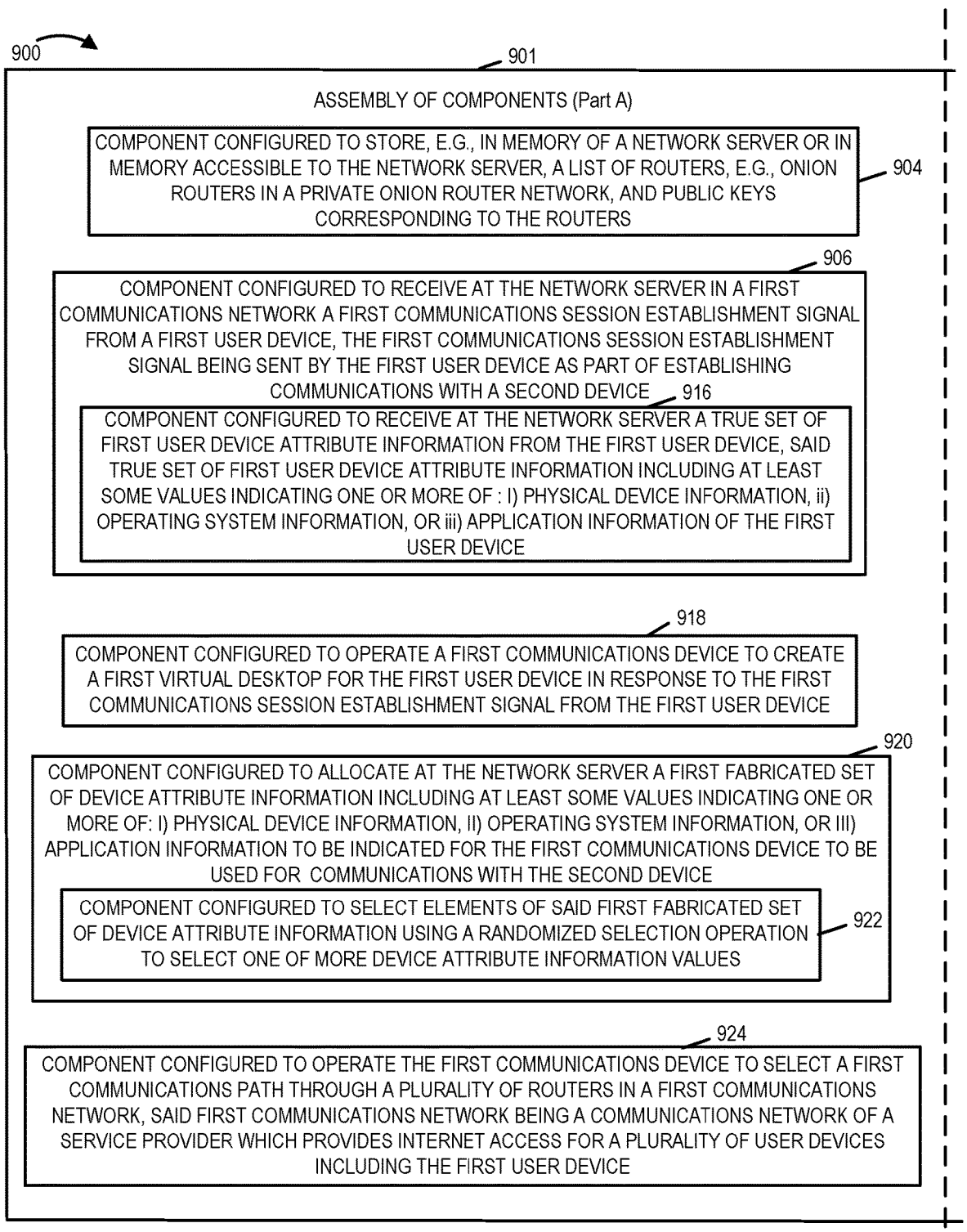
FIG. 8A is a first part of a drawing of an assembly of components which may be included in an exemplary network server in accordance with an exemplary embodiment.
Figure 8B:
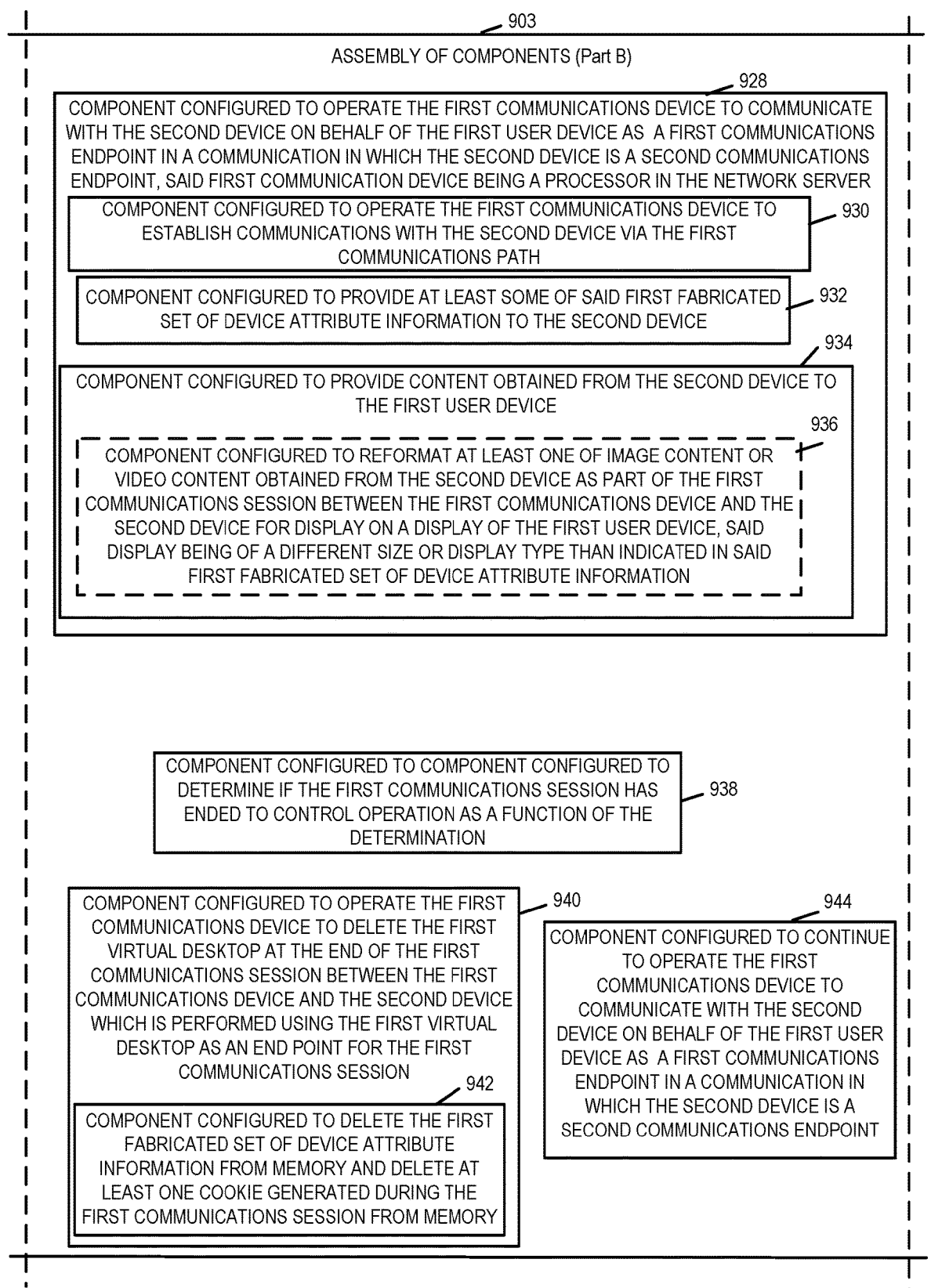
FIG. 8B is a second part of a drawing of an assembly of components which may be included in an exemplary network server in accordance with an exemplary embodiment.
Figure 8C:
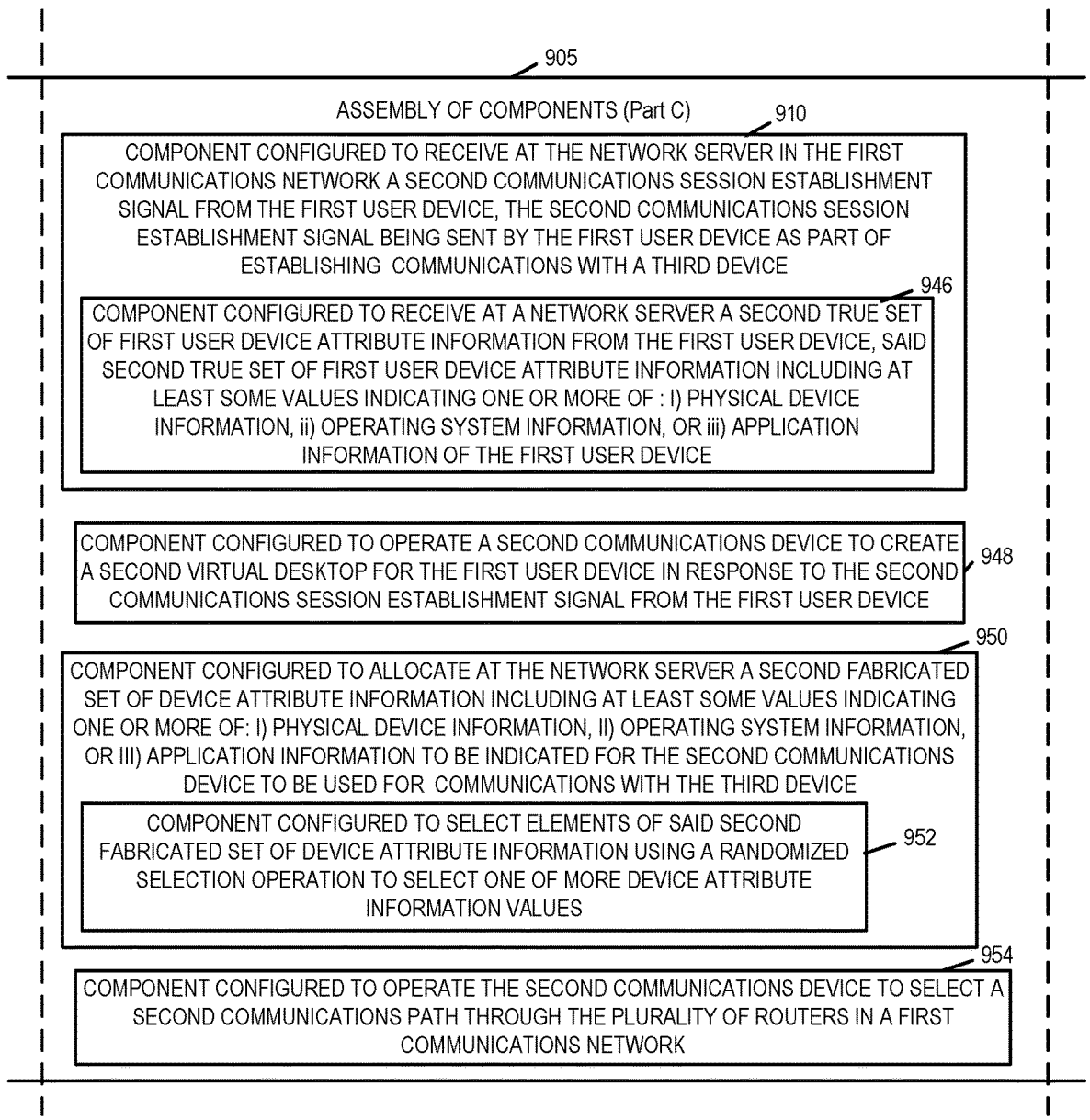
FIG. 8C is a third part of a drawing of an assembly of components which may be included in an exemplary network server in accordance with an exemplary embodiment.

FIG. 8, comprising the combination of FIG. 8A, FIG. 8B, FIG. 8C, and FIG. 8D, is a drawing of an assembly of components 900, comprising the combination of Part A 901, Part B 903, Part C 905, and Part D 907, which may be included in an exemplary network server, e.g., network server 108, in accordance with an exemplary embodiment.

Assembly of components 900 includes a component 904 configured to store, e.g., in memory of a network server or in memory accessible to the network server, a list of routers, e.g., onion routers in a private onion router network, and public keys corresponding to the routers. In some embodiments, component 904 is further configured to store IP addresses corresponding to the list of routers. Assembly of components 900 further includes a component 906 configured to receive at the network server in a first communications network a first communications session establishment signal from a first user device, the first communications session establishment signal being sent by the first user device as part of establishing communications with a second device. Component 906 includes a component 916 configured to receive at the network server a true set of first user device attribute information from the first user device said true set of first user device attribute information including at least some values indicating one or more if: i) physical device information, ii) operating system information, or iii) application information of the first user device. Assembly of component 900 further includes a component 918 configured to operate a first communications device to create a first virtual desktop for the first user device in response to the first communications session establishment signal from the first user device, and a component 920 configured to allocate at the network server a first fabricated set of device attribute information including at least some values indicating one or more of: i) physical device information, ii) operating system information, or iii) application information to be indicated for the first communications device to be used for communications with the second device. Component 920 includes a component 922 configured to select elements of said first fabricated set of device information using a randomized selection operation to select one or more device attribute information values. Assembly of components 900 includes a component 924 configured to operate the first communications device to select a first communications path through a plurality of routes in a first communications network, said first communications network being a communications network of a service provider which provides Internet access for a plurality of user devices including the first user device, and a component 928 configured to operate the first communications device to communicate with the second device on behalf of the first user device as a first communications endpoint in a communication in which the second device is a second communications endpoint, said first communications device being a processor in the network server. Component 928 includes a component 930 configured to operate the first communications device to establish communications with the second communications device via the first communications path, a component 932 configured to provide at least some of said first fabricated set of device attribute information to the second device, and a component configured to provide content obtained from the second device to the first user device. Component 932 includes a component 936 configured to reformat at least one of the image content or video content obtained from the second device as part of the first communications session between the first communication device and the second device for display on a display of the second user device, said display being of a different size or display type than indicated in said first fabricated set of device attribute information.

Assembly of components 900 further includes a component 938 configured to determine if the first communications session has ended and to control operation as a function of the determination, a component 940 configured to operate the first communications device to delete the first virtual desktop at the end of the first communications session between the first communications device and the second device which is performed using the first virtual device as and end point for the first communications session, and a component 944 configured to continue to operate the first communications device to communicate with the second device on behalf of the first user device as a first communications endpoint in a communication in which the second device is an second communications endpoint in response to the determination that the first communications session has not ended. Component 940 includes a component 942 configured to delete the first fabricated set of device attribute information from memory and delete at least one cookie generated during the first communications session from memory.

Assembly of components 900 further includes a component 910 configured to receive at the network server in the first communications network a second communications session establishment signal from the first user device, the second communications session establishment signal being sent by the first user device as part of establishing communications with a third device. Component 910 includes a component 946 configured to receive at the network server a second true set of first user device attribute information from the first user device said second true set of first user device attribute information including at least some values indicating one or more if: i) physical device information, ii) operating system information, or iii) application information of the first user device. Assembly of component 900 further includes a component 948 configured to operate a second communications device to create a second virtual desktop for the first user device in response to the second communications session establishment signal from the first user device, a component 950 configured to allocate at the network server a second fabricated set of device attribute information including at least some values indicating one or more of: i) physical device information, ii) operating system information, or iii) application information to be indicated for the second communications device to be used for communications with the third device. Component 950 includes a component 952 configured to select elements of said second fabricated set of device information using a randomized selection operation to select one or more device attribute information values. Assembly of components 900 includes a component 954 configured to operate the second communications device to select a second communications path through a plurality of routers in the first communications network, said first communications network being a communications network of a service provider which provides Internet access for a plurality of user devices including the first user device, and a component 958 configured to operate the second communications device to communicate with the third device on behalf of the first user device as a third communications endpoint in a communication in which the third device is a fourth communications endpoint, said second communications device being a processor in the network server. Component 958 includes a component 960 configured to operate the second communications device to establish communications with the third device via the second communications path, a component 962 configured to provide at least some of said second fabricated set of device attribute information to the third device, and a component 964 configured to provide content obtained from the third device to the first user device. Component 964 includes a component 966 configured to reformat at least one of the image content or video content obtained from the third device as part of the second communications session between the second communication device and the third device for display on a display of the first user device, said display being of a different size or display type than indicated in said second fabricated set of device attribute information.

Assembly of components 900 further includes a component 968 configured to determine if the second communications session has ended and to control operation as a function of the determination, a component 970 configured to operate the second communications device to delete the second virtual desktop at the end of the second communications session between the second communications device and the third device which is performed using the second virtual device as and end point for the second communications session, and a component 974 configured to continue to operate the second communications device to communicate with the third device on behalf of the first user device as a third communications endpoint in a communication in which the third device is an fourth communications endpoint in response to the determination that the second communications session has not ended. Component 970 includes a component 972 configured to delete the second fabricated set of device attribute information from memory and delete at least one cookie generated during the second communications session from memory.

Figure 9:
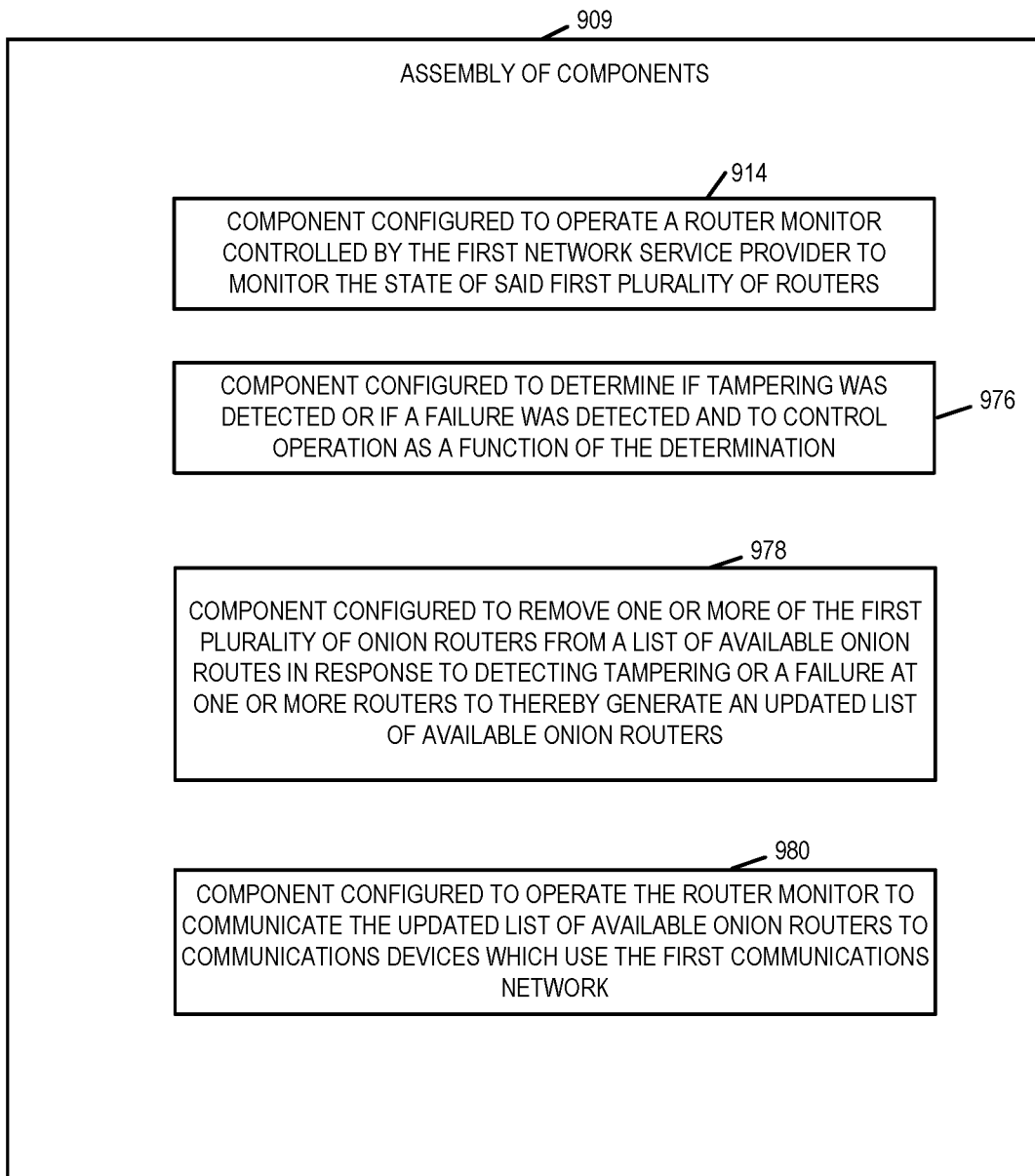
FIG. 9 is a drawing of an assembly of components which may be included in an exemplary monitoring device in accordance with an exemplary embodiment.

FIG. 9 is a drawing of an exemplary assembly of components 909 which may be included in exemplary monitoring device, e.g., monitoring device 180, e.g., a router monitoring server, of first communications network 101 of system 100 of FIG. 1 and of FIG. 7, in accordance with an exemplary embodiment. The components in the assembly of components 909 can, and in some embodiments are, implemented fully in hardware within the processor 802, e.g., as individual circuits. The components in the assembly of components 909 can, and in some embodiments are, implemented fully in hardware within the assembly of hardware components 804, e.g., as individual circuits corresponding to the different components. In other embodiments some of the components are implemented, e.g., as circuits, within the processor 802 with other components being implemented, e.g., as circuits within assembly of components 804, external to and coupled to the processor 802. As should be appreciated the level of integration of components on the processor and/or with some components being external to the processor may be one of design choice. Alternatively, rather than being implemented as circuits, all or some of the components may be implemented in software and stored in the memory 812 of the monitoring device 180, with the components controlling operation of device 180 to implement the functions corresponding to the components when the components are executed by a processor, e.g., processor 802. In some such embodiments, the assembly of components 909 is included in the memory 812 as assembly of software components 818. In still other embodiments, various components in assembly of components 909 are implemented as a combination of hardware and software, e.g., with another circuit external to the processor providing input to the processor 802 which then under software control operates to perform a portion of a component's function. While processor 802 is shown in the FIG. 7 embodiment as a single processor, e.g., computer, it should be appreciated that the processor 802 may be implemented as one or more processors, e.g., computers.

When implemented in software the components include code, which when executed by the processor 802, configure the processor 802 to implement the function corresponding to the component. In embodiments where the assembly of components 909 is stored in the memory 812, the memory 812 is a computer program product comprising a computer readable medium comprising code, e.g., individual code for each component, for causing at least one computer, e.g., processor 802, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 9 control and/or configure the monitoring device 180 or elements therein such as the processor 802, to perform the functions of corresponding steps illustrated and/or described in the method of one or more of the flowcharts, signaling diagrams and/or described with respect to any of the Figures. Thus the assembly of components 909 includes various components that perform functions of corresponding one or more described and/or illustrated steps of an exemplary method, e.g., one or more steps of the method of FIG. 2.

FIG. 9 is a drawing of an assembly of components 909 which may be included in an exemplary monitoring device, e.g., monitoring device 180, e.g., a router monitor, in accordance with an exemplary embodiment. Assembly of components 909 includes a component 914 configured to operate a router monitor controlled by the first network service provider to monitor the state of said first plurality of routers, a component 976 configured to determine if tampering was detected or if a failure was detected and to control operation as a function of the determination, a component 978 configured to remove one or more of the first plurality of onion routers from a list of available onion routers in response to detecting tampering or a failure at one or more routers to thereby generate an updated list of available onion routers, and a component 980 configured to operate the router monitor to communicate the updated list of available onion routers to communications devices which use the first communications network.

Various aspects and/or features of some embodiments of the present invention are further discussed below. Various embodiments of the present invention are well suited for implementing and/or supporting a system for secure anonymous communications that solves the weaknesses of the current solutions and offers a simple approach to online privacy. A large and important asset of an Internet Service Providers is the ISP's network. ISPs that provide Internet services directly to consumers provide or lease gateways and/or routers for their customers to use. This allows the ISP to configure the router software and install diagnostics tools, a more intuitive, simplified user interface, and additional services to increase the value of their offering. An exemplary embodiment in accordance with the present invention includes onion routing software in the ISP provided routers to create multiple virtual tunnels between the source and destination of an online communication. Data packets take different paths through a minimum of 4 nodes and up to 6 nodes, in one exemplary embodiment, to conceal the source. In some embodiments, more than 6 nodes are used. Messages are encrypted using onion routing.

An onion is the data structure formed by "wrapping" a message with successive layers of encryption to be decrypted ("peeled" or "unwrapped") by as many intermediary computers as there are layers before arriving at its destination. The original message remains hidden as it is transferred from one node to the next, and no intermediary knows both the origin and final destination of the data, allowing the sender to remain anonymous.

Various embodiments, implemented in accordance with features of the current invention use anonymous, virtual desktops or virtual shells that are remotely accessed by the user and used for secure anonymous communication. These virtual desktops or virtual shells are ephemeral and only exist for a short duration, e.g., for 1 hour. When a new user session begins a remote desktop session request is created. These virtual desktops, in some embodiments, include no state and have no user data or other identifiable information. In one example the MAC address, hostname, user agent, e.g., what type of device it is, for example, a desktop computer, a tablet, or a smart TV, etc., and IP address are randomly assigned or conditionally randomly assigned to the virtual desktop. The user controls the remote desktop and can open a browser, chat, or send instant messages. Messages are wrapped in multiple layers of encryption and transmitted through multiple routers at random before arriving at the destination. The receiver of the message has no way of identifying the sender because of the large number of virtual tunnels the data has traveled. Each router can only see the router that transmitted the message to it and the next route in the destination. The router cannot tell if the previous route was the originator of the communication or another router; moreover, each router cannot tell what position they are in the chain of virtual tunnels.

Using a remote virtual desktop or remote shell to originate requests or send messages, instead of the user's computing device, the source is further obfuscated. This approach protects against the user's computing device being infected with malware that identifies the source and eliminates anonymity. If a virtual desktop gets infected with malware during a user's session, their identity is still preserved since the messages are transmitted through multiple routers before arriving at the virtual desktop. Furthermore, at the end of the user's session, the virtual desktop is destroyed along with any malware or data on the virtual desktop. This approach also protects against canvas fingerprinting, mouse fingerprinting, tracking tags, cookies, or the risk of leaking files or other personally identifiable information from the user's computer. This is because the canvas of the remote virtual desktop is not the real canvas of the user's computer, and it changes for each session. Existing cookies cannot be read to identify the user because the virtual desktop is destroyed after each use and contains no data. Logged in accounts, such as Google or Facebook cannot be used to identify you because the virtual desktop is stateless and contains no data.

Various embodiments, in accordance with the present invention, solve one or more problems and/or weaknesses of Tor including the following problems:

Tor is Difficult set up and perform configuration.
Tor is ineffective against malware on the source computer.
It is becoming increasingly easy to identify the sender of a communication by controlling the exit node or controlling one or more tor routers.
DDoS attacks can be used to give up the source of online communications.
The Tor network consists of volunteers and the health and maintenance of the network can not be guaranteed.
There are fewer than 7,000 Tor routers; and half are using old versions of the routing software.

Various aspects and/or advantages of the some embodiments of the present invention related to a secure and maintained network with now be described. Internet Service Providers monitor and maintain their network and equipment. By keeping each of the encrypted messages within the ISP's network prior to being delivered to the final destination, message latency is greatly improved. With so many relay nodes, the random routing algorithms can be configured to favor virtual tunnels having low latency and low levels of congestion. However, the path can never be taken more than once. This allows for optimized routing and improved performance while ensuring privacy.

Various aspects and/or advantages of the some embodiments of the present invention related to tamper resistant routers will now be described. One of the vulnerabilities of the Tor network is that relay nodes or exit nodes can be controlled and the source and destination communications coming into and out of this node can be logged to correlate traffic patterns and help identify the message originator. Internet Service Providers control the software on the routers they provide to their customers and employ health checks to ensure they are operating healthy. The software on the routers can detect if they have been tampered and notify the server which will flag the onion routing node as being out of service (or in quarantine). Encrypted messages will no longer route to or from routers in this state. The Internet Service Provider can, and in some embodiments does, automatically update the router firmware to its previous state.

Various aspects and/or advantages of the some embodiments of the present invention related to privacy will now be described. The Tor network is a volunteer network consisting of a fewer than 7000 relay nodes, as of Sep. 1, 2017. There are around $3.43 \times 10^{11}$ different routes a message can take from source to destination, assuming a message is routed across 3 nodes, which is the default configuration because of latency. Internet Service Providers have many millions of customers and can install relay nodes across some or all of their routers. For example 5,000,000 relay nodes with a minimum of routing across 4 nodes provides $6.25 \times 10^{26}$ different routes a message can take. This is roughly 2,000,000,000,000,000 times as many combinations as the Tor network provides today.

Various aspects and/or advantages of the some embodiments of the present invention related to simplicity will now be described. Secure anonymous communications, in an exemplary embodiment, has never been easier for the end user. When an ISP creates a large scale, distributed network of secure relay nodes and provides pre-configured virtual desktops and virtual shells, in accordance with an exemplary embodiment of the current invention, the end user does not need to be an expert in electronic security or keep up with all of the exploits. Moreover, the end user doesn't need to have dedicated hardware (computer) that is only used for anonymous communications.

Various embodiments in accordance with the present invention differs from the Tor network in the one or more of the following ways:

Tor relays run on computers; various embodiments in accordance with the present invention embed the relay logic into the router firmware which improves performance and reduces at least one network hop.

Various exemplary embodiments in accordance with the present invention use ephemeral remote desktops and remote shells for users to establish anonymous online sessions and communications.

Some embodiments in accordance with the present invention use methods of detecting and automatically quarantining compromised relay nodes.

Various embodiments in accordance with the present invention obfuscates some or all identifiable information, including, e.g., the user's geo-location, by using a remote virtual desktop or remote shell. It will appear as though the message came from a computing device having a fabricated, but realistic, MAC address, IP, hostname, and user agent.

Set forth below are various exemplary numbered embodiments. Each set of numbered exemplary embodiments is numbered by itself with embodiments in a set referring to previous numbered embodiments in the same set.

List of Set of Exemplary Numbered Method Embodiments

Method Embodiment 1 A communications method, the method comprising: receiving, at a network server in a first communications network, a first communication session establishment signal from a first user device, said first communications session establishment signal being sent by said first user device as part of establishing communications (e.g., anonymous communications) with a second device (e.g., request establishment of a session including new virtual desktop device which can be used to communicate with one or more other devices over the Internet such as in a browser session or web page lookup); allocating, at the network server, a first fabricated set of device attribute information (e.g. information about the characteristics of the device such as operating system, screen size, set of install applications, processor type, MAC address, etc.) including at least some values indicating one or more of: i) physical device information (e.g., screen size, screen type, mobile device or pc, device brand, memory amount, processor type, etc), ii) operating system information; or iii) application information to be indicated for a first communications device, to be used for communications with the second device; and operating the first communications device to communicate with the second device on behalf of the first user device as a first communications end point in a communication in which the second device is a second communications end point, said first communications device being a processor in the network server, said step of operating the first communications device to communicate with the second device on behalf of the first user device including: operating the first communications device to establish communications with the second device via a first communications path; providing at least some of said first fabricated set of device attribute information to the second device; and providing content obtained from the second device to the first user device.

Method Embodiment 2 The method of method embodiment 1, further comprising: operating the first communications device select said first communications path through a first plurality of routers in a first communications network, said first communication network being a communications network of a service provider which provides Internet access to a plurality of user devices including said first user device.

Method Embodiment 3 The method of method embodiment 1, further comprising: receiving at the network server a true set of first user device attribute information from the first user device, said true set of first user device attribute information including at least some values indicating one or more of: i) physical device information (e.g., screen size, screen type, mobile device or pc, device brand, memory amount, processor type, etc), ii) operating system information; or iii) application information of the first user device.

Method Embodiment 4 The method of method embodiment 1, wherein said allocating includes selecting elements of said first fabricated set of device attribute information using a randomized selection operation to select one or more device attribute information values.

Method Embodiment 5 The method of method embodiment 4, wherein said randomized selection operation selects at least one of a MAC ID, screen size, operating system type, processor id, processor speed, set of applications on the device, or device location.

Method Embodiment 6 The method of method embodiment 5, wherein said randomized selection is a constrained randomized selection in which the device attribute information values which are selected for the first fabricated set are device information values which represent compatible device attributes or capabilities that could be expected in an actual physical device of a device type indicated by a device type value selected to be included in said first fabricated set of device information.

Method Embodiment 7 The method of method embodiment 6, wherein said constrained randomized selection is further constrained to restrict the first fabricated set of device attribute information to include one or more device type values which are different from corresponding device type values of said first user device (e.g., the network server prevents one or more device attributes matching the attribute values found in the true set of first user device attribute information.

Method Embodiment 8 The method of method embodiment 7, wherein the first fabricated set of device attribute information includes at least two of a MAC address value, a processor identifier value, a screen size value or an operating system value which provides information which is different from the corresponding information for the first user device (the first fabricated set of device attribute information intentionally includes what would be considered false or inaccurate information if it was interpreted as describing the first user device).

Method Embodiment 9 The method of method embodiment 8, comprising: operating the first communications device to create a first virtual desktop for the first user device in response to the first communication session establishment signal from said first user device.

Method Embodiment 10 The method of method embodiment 9, further comprising: operating the first communications device to delete the first virtual desktop at the end of a first communications session between the first communications device and the second device which is performed using the first virtual desktop as an end point for the first communications session.

Method Embodiment 11 The method of method embodiment 10, wherein deleting the first virtual desktop includes deleting said first fabricated set of device attribute information from memory and deleting at least one cookie generated during said first communications session from memory.

Method Embodiment 12 The method of method embodiment 10, further comprising: reformatting at least one of image content or video content obtained from said second device as part of the first communications session between the first communications device and the second device for display on a display of the first user device, said display being of a different size or display type than indicated in said first fabricated set of device attribute information.

Method Embodiment 13 The method of method embodiment 10, further comprising: receiving, at the network server in the first communications network, a second communication session establishment signal from said first user device, said second communications session establishment signal being sent by said first user device as part of establishing communications(e.g., anonymous communications) with a third device (e.g., request establishment of a new session including new virtual desktop device which can be used to communicate with the third device over the Internet such as in a browser session or web page lookup); allocating, at the network server, a second fabricated set of device attributes (e.g. information about the characteristics of the virtual communications device such as operating system, screen size, set of install applications, processor type, MAC address, etc.) including at least some values indicating one or more of: i) physical device information (e.g., screen size, screen type, mobile device or pc, device brand, memory amount, processor type, etc), ii) operating system information; or iii) application information to be indicated for a second communications device, to be used for communications with the third device; operating a second communications device to select a second communications path through the first plurality of routers in the first communications network; and operating a second communications device (second virtual device on the first processor or a different processor of the network server) to communicate with the third device on behalf of the first user device as a third communications end point in a communication in which the third device is a fourth communications end point, said second communications device being a processor in the network server (e.g., same or different processor than used for the first communications device), said step of operating the second communications device to communicate with the third device on behalf of the first user device including: operating the second communications device to establish communications with the third device via the second communications path; providing at least some of said second fabricated set of device attribute information to the third device; and providing content obtained from the third device to the first user device.

Method Embodiment 14 The method of method embodiment 13, wherein the first plurality of routers in the first communications network are routers which support onion routing, each of the onion routers having a public key known to the first communications device and a private key which is not known to the first communications device, the method further comprising: operating a router monitor controlled by the first network service provider to monitor the state of said first plurality of routers; and remove one or more of the first plurality of onion routers from a list of available onion routers in response to detecting tampering or a failure at the one or more routers to thereby generated an updated list of available onion routers.

Method Embodiment 15 The method of method embodiment 14, further comprising: operating the network monitor to communicate the updated list of available onion routers to communications devices which use the first communications network; and wherein the updated list of onion routers is received by the second communications device prior to selection of the second communications path, the step of operating the second communications device to select the second communications path through the first plurality of routers in the first communications network including selecting for inclusion in the second communications path only routers listed in updated list of available onion routers and not selecting routers which were removed from list of available onion routers.

List of Set of Exemplary Numbered System Embodiments

System Embodiment 1 A communications system, the system comprising: a network server in a first communications network, the network server including: i) a first interface configured to receive a first communication session establishment signal from a first user device, said first communications session establishment signal being sent by said first user device as part of establishing communications with a second device and ii) one or more processors configured to: allocate, at the network server, a first fabricated set of device attribute information including at least some values indicating one or more of: i) physical device information, ii) operating system information; or iii) application information to be indicated for a first communications device, to be used for communications with the second device; and operate as a first communications device to communicate with the second device on behalf of the first user device as a first communications end point in a communication in which the second device is a second communications end point, operating as the first communications device to communicate with the second device on behalf of the first user device including: establishing communications with the second device via a first communications path; providing at least some of said first fabricated set of device attribute information to the second device; and providing content obtained from the second device to the first user device.

System Embodiment 2 The system of system embodiment 1, wherein the processor operating as the first communications device is further configured to: select said first communications path through a first plurality of routers in a first communications network, said first communication network being a communications network of a service provider which provides Internet access to a plurality of user devices including said first user device.

System Embodiment 3 The system of system embodiment 1, wherein the processor at the network server operating as the first communications device is further configured to: receive a true set of first user device attribute information from the first user device, said true set of first user device attribute information including at least some values indicating one or more of: i) physical device information, ii) operating system information; or iii) application information of the first user device.

System Embodiment 4 The system of system embodiment 1, wherein said processor acting as the first network device is further configured, as part of said allocating, to: select elements of said first fabricated set of device attribute information using a randomized selection operation to select one or more device attribute information values.

System Embodiment 5 The system of system embodiment 4, wherein said randomized selection operation selects at least one of a MAC ID, screen size, operating system type, processor id, processor speed, set of applications on the device, or device location.

System Embodiment 6 The system of system embodiment 5, wherein said randomized selection is a constrained randomized selection in which the device attribute information values which are selected for the first fabricated set are device information values which represent compatible device attributes or capabilities that could be expected in an actual physical device of a device type indicated by a device type value selected to be included in said first fabricated set of device information.

System Embodiment 7 The system of system embodiment 6, wherein said constrained randomized selection is further constrained to restrict the first fabricated set of device attribute information to include one or more device type values which are different from corresponding device type values of said first user device.

System Embodiment 8 The system of system embodiment 7, wherein the first fabricated set of device attribute information includes at least two of a MAC address value, a processor identifier value, a screen size value or an operating system value which provides information which is different from the corresponding information for the first user device.

System Embodiment 9 The system of system embodiment 8, wherein the processor operating as the first communications device is further configured to: create a first virtual desktop for the first user device in response to the first communication session establishment signal from said first user device.

System Embodiment 10 The system of system embodiment 9, wherein the processor operating as the first communications device is further configured to: delete the first virtual desktop at the end of a first communications session between the first communications device and the second device which is performed using the first virtual desktop as an end point for the first communications session.

System Embodiment 11 The system of system embodiment 10, wherein said server includes memory; and wherein the processor configured to operate as the first communications device is configure to delete said first fabricated set of device attribute information from memory and delete at least one cookie generated during said first communications session from the memory as part of deleting the first virtual desktop.

System Embodiment 12 The system of system embodiment 10, wherein the processor operating as the first communications device is further configured to: reformat at least one of image content or video content obtained from said second device as part of the first communications session between the first communications device and the second device for display on a display of the first user device, said display being of a different size or display type than indicated in said first fabricated set of device attribute information.

System Embodiment 13 The system of system embodiment 10, wherein said interface at the network server is further configured to: receive, at the network server in the first communications network, a second communication session establishment signal from said first user device, said second communications session establishment signal being sent by said first user device as part of establishing communications (e.g., anonymous communications) with a third device (e.g., request establishment of a new session including new virtual desktop device which can be used to communicate with the third device over the Internet such as in a browser session or web page lookup); and wherein said one or more processors is further configured to allocate, at the network server, a second fabricated set of device attributes (e.g. information about the characteristics of the virtual communications device such as operating system, screen size, set of install applications, processor type, MAC address, etc.) including at least some values indicating one or more of: i) physical device information (e.g., screen size, screen type, mobile device or pc, device brand, memory amount, processor type, etc), ii) operating system information; or iii) application information to be indicated for a second communications device, to be used for communications with the third device; and operate one of said one or more processors as a second communications device, operating said one or more processors as a second communications device including: operating a processor operating as the second communications device to select a second communications path through the first plurality of routers in the first communications network; and operating the processor operating as the second communications device (second virtual device on the first processor or a different processor of the network server) to: communicate with the third device on behalf of the first user device as a third communications end point in a communication in which the third device is a fourth communications end point, said second communications device being a processor in the network server (e.g., same or different processor than used for the first communications device), communicating with the third device on behalf of the first user device including: establishing communications with the third device via the second communications path; providing at least some of said second fabricated set of device attribute information to the third device; and providing content obtained from the third device to the first user device.

List of Set of Exemplary Numbered Computer Readable Medium Embodiments

Computer Readable Medium Embodiment 1 A non-transitory computer readable medium including computer executable instructions which when executed by one or more processors of a network server cause the network server to perform the steps of: receiving, at the network server in a first communications network, a first communication session establishment signal from a first user device, said first communications session establishment signal being sent by said first user device as part of establishing communications (e.g., anonymous communications) with a second device (e.g., request establishment of a session including new virtual desktop device which can be used to communicate with one or more other devices over the Internet such as in a browser session or web page lookup); allocating, at the network server, a first fabricated set of device attribute information (e.g. information about the characteristics of the device such as operating system, screen size, set of install applications, processor type, MAC address, etc.) including at least some values indicating one or more of: i) physical device information (e.g., screen size, screen type, mobile device or pc, device brand, memory amount, processor type, etc), ii) operating system information; or iii) application information to be indicated for a first communications device, to be used for communications with the second device; and operating the first communications device to communicate with the second device on behalf of the first user device as a first communications end point in a communication in which the second device is a second communications end point, said first communications device being a processor in the network server, said step of operating the first communications device to communicate with the second device on behalf of the first user device including: operating the first communications device to establish communications with the second device via a first communications path; providing at least some of said first fabricated set of device attribute information to the second device; and providing content obtained from the second device to the first user device.

The techniques of various embodiments may be implemented using software, hardware and/or a combination of software and hardware. Various embodiments are directed to apparatus, e.g., user devices, servers, customer premises equipment devices, cable systems, network nodes, gateways, cable headend/hubsites, network monitoring node/servers, cluster controllers, cloud nodes, production nodes, cloud services servers and/or network equipment devices. Various embodiments are also directed to methods, e.g., method of controlling and/or operating user devices, gateways, servers, cable networks, cloud networks, nodes, servers, cloud service servers, customer premises equipment devices, controllers, network monitoring nodes/servers and/or cable or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., communications nodes such as controllers are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as a cluster controller including, with a processor which includes a component corresponding to each of the steps of the various described methods performed by the device in which the processor is included. In some but not all embodiments a device, e.g., communications node such as a controller, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a controller or other device described in the present application. In some embodiments components are implemented as hardware devices in such embodiments the components are hardware components. In other embodiments components maybe implemented as software, e.g., a set of processor or computer executable instructions. Depending on the embodiment the components maybe all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method, the method comprising:
receiving, at a network server in a first communications network, a first communication session establishment signal from a first user device, said first communications session establishment signal being sent by said first user device as part of communicating with a second device;
allocating, at the network server, a first fabricated set of device attribute information including at least some values indicating one or more of: i) physical device information, ii) operating system information; or iii) application information to be indicated for a first communications device, to be used for communications with the second device, said allocating including selecting elements of said first fabricated set of device attribute information using a randomized selection operation to select one or more device attribute information values;

operating the first communications device to communicate with the second device on behalf of the first user device as a first communications end point in a communication in which the second device is a second communications end point; and providing at least some of said one or more device attribute information values selected by said randomized selection operation to the second device on behalf of the first user device.

2. The method of claim 1, further comprising:
operating the first communications device to select aid a first communications path through a first plurality of routers in the first communications network, said first communication network being a communications network of a service provider which provides Internet access to a plurality of user devices including said first user device.

3. The method of claim 1, further comprising:
receiving at the network server a true set of first user device attribute information from the first user device, said true set of first user device attribute information including at least some values indicating one or more of: i) physical device information, ii) operating system information; or iii) application information of the first user device.

4. The method of claim 1, wherein the first fabricated set of device attribute information includes screen size information.

5. The method of claim 1, wherein said randomized selection operation selects at least one of a MAC ID, screen size, operating system type, processor identifier, processor speed, set of applications on the device, or device location.

6. The method of claim 5, wherein said randomized selection operation is a selection in which the device attribute information values which are selected for the first fabricated set are device information values which represent compatible device attributes or capabilities that could be expected in an actual physical device of a device type indicated by a device type value selected to be included in said first fabricated set of device information.

7. The method of claim 5, wherein said randomized selection operation is constrained to restrict the first fabricated set of device attribute information to include a device type value which is different from a corresponding device type value of said first user device.

8. The method of claim 7, wherein the first fabricated set of device attribute information includes at least two of a MAC ID value, a processor identifier value, a screen size value or an operating system type value which provides information which is different from the corresponding information for the first user device.

9. The method of claim 8, further comprising:
operating the first communications device to create a first virtual desktop for the first user device in response to the first communication session establishment signal from said first user device.

10. The method of claim 9, further comprising:
operating the first communications device to delete the first virtual desktop at the end of a first communications session between the first communications device and the second device which is performed using the first virtual desktop as an end point for the first communications session.

11. The method of claim 10, further comprising:
reformatting at least one of image content or video content obtained from said second device as part of the first communications session between the first communications device and the second device for display on a display of the first user device, said display being of a different size or display type than indicated in said first fabricated set of device attribute information.

12. The method of claim 10, further comprising:
receiving, at the network server in the first communications network, a second communication session establishment signal from said first user device, said second communications session establishment signal being sent by said first user device as part of establishing communications with a third device;

allocating, at the network server, a second fabricated set of device attributes including at least some values indicating one or more of: i) physical device information, ii) operating system information; or iii) application information to be indicated for a second communications device, to be used for communications with the third device;

operating a second communications device to select a second communications path through a first plurality of routers in the first communications network; and operating a second communications device to communicate with the third device on behalf of the first user device as a third communications end point in a communication in which the third device is a fourth communications end point, said second communications device being a processor in the network server, said step of operating the second communications device to communicate with the third device on behalf of the first user device including:
operating the second communications device to establish communications with the third device via the second communications path;
providing at least some of said second fabricated set of device attribute information to the third device; and
providing content obtained from the third device to the first user device.

13. The method of claim 12, wherein the first plurality of routers in the first communications network are onion routers which support onion routing, each of the onion routers having a public key known to the first communications device and a private key which is not known to the first communications device, the method further comprising:
operating a router monitor controlled by a first network service provider to monitor the state of said first plurality of routers; and
remove one or more of the first plurality of onion routers from a list of available onion routers in response to detecting tampering or a failure at the one or more routers to thereby generate an updated list of available onion routers.

14. A communications system, the system comprising:
a network server in a first communications network, the network server including:
i) a first interface configured to receive a first communication session establishment signal from a first user device, said first communications session establishment signal being sent by said first user device as part of communicating with a second device; and ii) one or more processors configured to:

allocate, at the network server, a first fabricated set of device attribute information including at least some values indicating one or more of: i) physical device information, ii) operating system information; or iii) application information to be indicated for a first communications device, to be used for communications with the second device, said allocating including selecting elements of said first fabricated set of device attribute information using a randomized selection operation to select one or more device attribute information values; and operate as a first communications device to communicate with the second device on behalf of the first user device as a first communications end point in a communication in which the second device is a second communications end point, operating as the first communications device to communicate with the second device on behalf of the first user device including:

providing at least some of said first fabricated set of device attribute information to the second device; and providing content obtained from the second device to the first user device.

15. The system of claim 14, wherein the processor operating as the first communications device is further configured to:

select a first communications path through a first plurality of routers in the first communications network, said first communication network being a communications network of a service provider which provides Internet access to a plurality of user devices including said first user device.

16. The system of claim 14, wherein the processor at the network server operating as the first communications device is further configured to:

receive a true set of first user device attribute information from the first user device, said true set of first user device attribute information including at least some values indicating one or more of: i) physical device information, ii) operating system information; or iii) application information of the first user device.

17. The system of claim 14, wherein said processor acting as the first network device is further configured, as part of said allocating, to:

select elements of said first fabricated set of device attribute information using a randomized selection operation to select one or more device attribute information values.

18. The system of claim 17, wherein said randomized selection operation selects at least one of a MAC ID, screen size, operating system type, processor identifier, processor speed, set of applications on the device, or device location.

19. The system of claim 18, wherein said randomized selection is a selection in which the device attribute information values which are selected for the first fabricated set are device information values which represent compatible device attributes or capabilities that could be expected in an actual physical device of a device type indicated by a device type value selected to be included in said first fabricated set of device information.

20. A non-transitory computer readable medium including computer executable instructions which when executed by one or more processors of a network server cause the network server to perform the steps of:

receiving, at the network server in a first communications network, a first communication session establishment signal from a first user device, said first communications session establishment signal being sent by said first user device as part of communicating with a second device;

allocating, at the network server, a first fabricated set of device attribute information including at least some values indicating one or more of: i) physical device information, ii) operating system information; or iii) application information to be indicated for a first communications device, to be used for communications with the second device, said allocating including selecting elements of said first fabricated set of device attribute information using a randomized selection operation to select one or more device attribute information values;

operating the first communications device to communicate with the second device on behalf of the first user device as a first communications end point in a communication in which the second device is a second communications end point; and providing at least some of said one or more device attribute information values selected by said randomized selection operation to the second device on behalf of the first user device.

* * * * *